United States Patent
Ford et al.

(10) Patent No.: US 8,057,901 B2
(45) Date of Patent: *Nov. 15, 2011

(54) COMPOSITE MATERIALS COMPRISING CARBON NANOTUBES AND METAL CARBONATES

(75) Inventors: William E. Ford, Stuttgart (DE); Jurina Wessels, Stuttgart (DE); Akio Yasuda, Esslingen (DE); Jack Barger, Poway, CA (US)

(73) Assignee: Sony Deutschland GmbH, Cologne (DE)

( * ) Notice: Subject to any disclaimer, the term of this patent is extended or adjusted under 35 U.S.C. 154(b) by 1162 days.

This patent is subject to a terminal disclaimer.

(21) Appl. No.: 11/596,358

(22) PCT Filed: May 13, 2005

(86) PCT No.: PCT/EP2005/005293
§ 371 (c)(1),
(2), (4) Date: Mar. 6, 2007

(87) PCT Pub. No.: WO2005/113432
PCT Pub. Date: Dec. 1, 2005

(65) Prior Publication Data
US 2007/0215841 A1    Sep. 20, 2007

Related U.S. Application Data

(60) Provisional application No. 60/571,022, filed on May 14, 2004.

(51) Int. Cl.
| H01B 1/00 | (2006.01) |
| H01B 1/12 | (2006.01) |
| H01B 1/04 | (2006.01) |
| H01B 1/06 | (2006.01) |
| H01B 1/24 | (2006.01) |
| B01J 19/08 | (2006.01) |
| C01B 31/02 | (2006.01) |
| C01B 31/00 | (2006.01) |
| D01F 9/127 | (2006.01) |
| C09C 1/56 | (2006.01) |
| B32B 9/04 | (2006.01) |
| B32B 9/00 | (2006.01) |

(52) U.S. Cl. ........ 428/408; 252/500; 252/502; 252/506; 252/509; 977/742; 977/745; 977/746; 977/748; 977/778; 977/904; 977/906; 977/919; 977/931; 977/932; 423/445 R; 423/445 B; 423/460; 428/411.1

(58) Field of Classification Search ............. 252/500, 252/502, 506, 509; 977/742, 745, 746, 748, 977/778, 904, 906, 919, 931, 932; 423/445 R, 423/445 B, 460; 428/411.1, 408

See application file for complete search history.

(56) References Cited

U.S. PATENT DOCUMENTS

| 5,030,597 | A | * | 7/1991 | Ogata et al. ............. 501/93 |
| 5,250,228 | A | * | 10/1993 | Baigrie et al. ........... 252/511 |
| 5,547,748 | A | * | 8/1996 | Ruoff et al. ............. 428/323 |
| 5,643,415 | A | * | 7/1997 | Wise .................. 162/181.2 |
| 6,420,293 | B1 | * | 7/2002 | Chang et al. ............ 501/95.2 |
| 7,531,157 | B2 | * | 5/2009 | Ford et al. ............. 423/447.1 |
| 7,854,914 | B2 | * | 12/2010 | Ford et al. ............. 423/447.2 |
| 2003/0042562 | A1 | * | 3/2003 | Giebeler et al. .......... 257/421 |
| 2003/0153965 | A1 | | 8/2003 | Supronowicz et al. |
| 2004/0126354 | A1 | * | 7/2004 | Song et al. ............... 424/76.1 |
| 2004/0262581 | A1 | * | 12/2004 | Rodrigues ............... 252/500 |
| 2006/0014375 | A1 | * | 1/2006 | Ford et al. ............... 438/622 |

FOREIGN PATENT DOCUMENTS

| EP | 1428793 | * | 6/2004 |
| WO | WO 2004052783 | * | 6/2004 |

OTHER PUBLICATIONS

Che et al. Metal-Nanocluster Filled Carbon Nanotubes. Langmuir 1999, 15, 750-758.*

* cited by examiner

*Primary Examiner* — Lorna M Douyon
*Assistant Examiner* — Tanisha Diggs
(74) *Attorney, Agent, or Firm* — Oblon, Spivak, McClelland, Maier & Neustadt, L.L.P.

(57) ABSTRACT

The invention relates to a carbon nanotube composite material, to methods of its production and to uses of such composite material.

74 Claims, 29 Drawing Sheets

COMPOSITE MATERIALS COMPRISING CARBON NANOTUBES AND METAL CARBONATES

This is an application filed under 35 U.S.C. 371 of PCT/EP05/05293, filed May 13, 2005, which claims the benefit of U.S. Provisional Application No. 60/571,022, filed May 14, 2004.

The invention relates to a carbon nanotube composite material, to methods of its production and to uses of such composite material.

Potential uses of carbon nanotubes (CNTs) are enormous due to outstanding properties such as: (1) good in-plane electrical conductivity, (2) high aspect ratio, (3) high chemical stability, and (4) high mechanical strength. These properties make CNTs attractive for use in composites, whereby the CNT component improves material properties such as tensile strength and electrical conductivity. Most of the composites that have been investigated are mixtures of CNTs and organic polymers. A few examples of composites of CNTs with inorganic substances (ceramics) have been reported. The inorganic components in these examples are carbides, nitrides, silicates, phosphates, or oxides of metals, including alumina, silica, titania, and hydroxyapatite.

Ceramic composites containing calcium carbonate are widespread, especially as biomaterials. Nacre, for example, which is also known as mother-of-pearl, is a natural composite material comprising more than 95 wt % calcium carbonate and 1-5% of organic matter. Nacre has outstanding mechanical properties, its fracture toughness being 3000 times greater than that of the calcium carbonate component alone. The growth of nacre and its resulting structural and mechanical properties depend largely on interactions between the inorganic and organic components.

Much effort has been made to mimic the biological processes in order to produce new composite materials. The organic components for such experiments are frequently polymers containing polar groups. The polar group most commonly employed is carboxylic acid (—COOH), which can bind to calcium carbonate by coordination to the calcium ion. Hydrogen bonding between carboxylate oxygen atoms of calcium carbonate and —NH groups of amide-containing polymers has been demonstrated as an alternative binding mechanism in synthetically produced crystalline composites of calcium carbonate. It is also possible to selectively grow or deposit crystals of calcium carbonate by patterning the surfaces of substrates with functional groups that either promote or inhibit calcium carbonate crystallization. Biomimetic composites have a number of applications, especially in the medical field as, for example, bone or tooth replacements and for the surface treatment of medical implants to make them biocompatible.

Besides biomedical applications, new types of CNT-containing composite materials are expected to be important in the development of electronic devices such as field emission displays (FEDs) and field effect transistors (FETs).

CNTs are considered to be one of the best electron field emitting materials available and ideal candidates for the next generation of FEDs. Two general approaches for fabricating the cathodes of FEDs are via directed growth of CNTs by chemical vapor deposition (CVD) and deposition of pre-synthesized CNTs. CVD generally requires reactive environments and temperatures (typically >800° C.), thereby preventing this method from being used for fabricating FEDs, which use low-melting-point (~650° C.) glass substrates and polymeric systems. Slurry-squeeze or screen-printing of pastes containing pre-synthesized CNTs is a relatively low cost process for large area field emitter applications, but the published processes generally require temperatures >300° C. for post-annealing the paste. Another process uses vacuum casting methods to deposit CNT-polymer films, but this process requires hot pressing to remove residual solvent and prevent voids in the films. CNT films for field emission have also been fabricated using electrophoretic deposition, but heating at 800° C. was required to remove the residual solvents. The only room-temperature technique for fabricating CNT field-emission cathodes reported so far utilizes self-assembly of CNTs on substrates by a dip-coating process, but this approach relies on surface interactions at the water-substrate-air triple line and is thus sensitive to fabrication conditions and difficult to control.

A main obstacle in fabricating CNT-based FEDs using conventional methods is to achieve a good electrical contact between the substrate and the CNTs. Poor electric contact results in resistive heating at the CNT-substrate interface, leading to permanent degradation in emission (Nilsson et al., *Applied Physics Letters* 79, 1036 (2001)). The scanning electron microscopy (SEM) measurements of CNTs deposited on various kinds of conductive substrates according to the embodiments of the present invention indicate that the CNTs make good electric contact with the substrates.

One of the most promising applications of CNTs involves their use as channels of FETs. In particular, transistors based on low densities of random arrays, or random networks, of single-walled CNTs (SWNTs) have been shown to have device performances exceeding those based on amorphous silicon or pentacene (Shiraishi et al., *Chemical Physics Letters* 394, 110 (2004); Meitl et al., *Nano Letters* 4, 1643 (2004); Zhou et al., *Nano Letters* 4, 2031 (2004); Hu et al., *Nano Letters* 4, 2513 (2004); Snow et al., *Applied Physics Letters* 86, 033105 (2005)). The use of liquid or solid electrolytes as gating materials can give improved device characteristics compared to back-gated devices (Kruger et al., *Applied Physics Letters* 78, 1291 (2001); Rosenblatt et al., *Nano Letters* 2, 869 (2002); Lu et al., *Nano Letters* 4, 623 (2004)). Furthermore, the performance of CNT-based FETs can be improved through electrical or chemical processes to modify the metallic nanotubes in the ensemble so that semiconducting rather than metallic pathways dominate the electrical transport (Avouris, *Chemical Physics* 281, 429 (2002); Joselevich, *Angewandte Chemie International Edition* 43, 2992 (2004); Balasubramanian et al., *Nano Letters* 4, 827 (2004); Seidel et al., *Nano Letters* 4, 831 (2004); Meitl et al., *Nano Letters* 4, 1643 (2004); Snow et al., *Applied Physics Letters* 86, 033105 (2005); Li and Zhang, *Carbon* 43, 651 (2005)) and/or by doping (Takenobu et al., *Nature Materials* 2, 683 (2003); Lu et al., *Nano Letters* 4, 623 (2004); Zhou et al., *Nano Letters* 4, 2031 (2004)). However, several challenges must be overcome before transistors based on random networks of CNTs can be made competitive to current CMOS-based transistors. These include the ability to control the position and density of CNTs in the networks.

Accordingly, it was an object of the present invention to provide for carbon nanotube composites that are easy to prepare and mimic the structure of naturally occurring organic-ceramic composites. It has also been an object of the present invention to provide for a method of producing carbon nanotube composites that allows carbon nanotubes to be deposited onto substrates without using particularly high temperatures, as they are generally used by prior art techniques. Furthermore, it has been an object of the present invention to provide for carbon nanotube composites that allow carbon nanotubes to be deposited onto substrates with control over both position and density while also providing good electrical contact between the substrate and the carbon nanotubes.

All these objects are solved by a composite material comprising:
carbon nanotubes and
a Me-carbonate, wherein Me represents a metal cation, preferably a divalent metal cation.

In one embodiment Me represents a mixture of different metal cations, wherein, preferably, Me represents $Ca^{2+}$ or $Mg^{2+}$ or a combination of $Ca^{2+}$ and $Mg^{2+}$.

In one embodiment said Me-carbonate is insoluble, or soluble to a negligible extent, in polar solvents, wherein, preferably, said polar solvent is water and said Me-carbonate is the carbonate of a divalent cation, preferably $CaCO_3$. Preferably, said Me-carbonate has a solubility product constant at 25° C., $K_{sp}$, wherein said $K_{sp}$ adopts values such that $-\log K_{sp}$ is in the range of from +3 to +33. The solubility product constant $K_{sp}$ is an entity to describe the solubility of sparingly soluble salts, as for example described and defined in Atkins "Physical Chemistry", $3^{rd}$ edition, Oxford University Press, Reprinted 1988, chapter 12.4, the content of which is hereby included in its entirety by reference.

In one embodiment the carbon nanotubes are single-walled, double-walled, or multi-walled carbon nanotubes or a mixture of any of the foregoing nanotubes.

Preferably, functional groups containing oxygen atoms, such as —COOH, —OH, —$CONH_2$, and/or —$CONHCONH_2$, are attached to said carbon nanotubes, which functional groups make the carbon nanotubes soluble or dispersible in polar solvents, such as water. As used herein, the term "composite" refers to a three-dimensional combination of at least two materials differing in form or composition, with a distinct interface separating the components. The particular composites of the present invention may also be considered organic-inorganic "hybrid" materials, inasmuch as the integration of components approaches a molecular scale. However, in some embodiments of this invention, reference is made to a "composite", in which one of the at least two components, by further processing steps, has been removed or possibly replaced.

The term "functional" herein is referring to imparting polar characteristics and "functional groups" herein refers to atoms or groups of atoms that impart polar characteristics to the molecule or material with which they are associated. In the composite material according to the present invention, polar characteristics imparted to the carbon nanotubes by such functional groups provide greater interaction between the nanotubes and polar solvents, the Me-carbonate, and the substrate. Functional groups may be associated with carbon nanotubes by direct covalent bonding between an atom (or atoms) in the functional group and an atom (or atoms) in the carbon nanotube. Alternatively, functional groups may be associated with carbon nanotubes indirectly, wherein there is direct covalent bonding between an atom (or atoms) in the functional group and an atom (or atoms) in a molecule that is non-covalently attached to the carbon nanotube.

The terms "soluble" and "dispersible", as well as the related pairs "solution"/"dispersion" and "dissolved"/"dispersed", are used interchangeably herein when referring to carbon nanotubes in solvents. However, solubility, in this context, is understood to not necessarily mean true molecular dispersion, but rather may refer to a colloidal dispersion or suspension in which several or many individual carbon nanotubes are associated into what is referred to as "bundles" or "ropes". These assemblies can further entangle into two-dimensional (2D) "films" and three-dimensional (3D) "mats" of randomly interconnected structures. Upon drying, such randomly interconnected structures may form flexible membrane-like materials sometimes also referred to as "bucky paper".

The term "polar solvent" is used herein when referring to a solvent that is suitable for producing a composite material according to the present invention. The particular features necessary for such a solvent are its ability to dissolve the carbon nanotube component and its inability to dissolve the Me-carbonate component of the composite material. The preferred polar solvent is water, but polar organic solvents that are miscible with water are also generally suitable. Suitable polar organic solvents include formamide ($HCONH_2$), N,N-dimethylformamide ($HCON(CH_3)_2$), 1-methyl-2-pyrrolidone (—$(CH_2)_3CON(CH_3)$—), dimethylsulfoxide $(CH_3)_2SO$, and the $C_1$-$C_3$ alcohols, where the latter term refers to organic alcohols containing one, two, or three carbon atoms, more specifically to methanol ($CH_3OH$), ethanol ($CH_3CH_2OH$), propanol ($CH_3CH_2CH_2OH$), isopropanol (($CH_3)_2CH_2OH$), ethylene glycol ($HOCH_2CH_2OH$), 1,3-propane glycol ($HOCH_2CH_2CH_2OH$), 1,2-propane glycol ($CH_3CHOHCH_2OH$), and glycerol ($HOCH_2CHOHCH_2OH$).

In one embodiment, said oxygen-containing functional groups making said carbon nanotubes soluble in polar solvents are located at the ends the nanotubes. This scenario has the advantage that it favors an end-to-end- or co-linear arrangement of tubes within the composite material. "Co-linear" here is used in the sense of being aligned on the same longitudinal axis.

In one embodiment said functional groups are located on the walls of said carbon nanotubes. This scenario is favorable for a parallel or side-by-side arrangement of tubes.

In one embodiment said functional groups are located on the ends and on the walls of said carbon nanotubes.

In one embodiment, said carbon nanotubes are aggregated into bundles or ropes.

Preferably, said carbon nanotubes with attached functional groups containing oxygen atoms have been mixed with urea and then heated to a temperature greater then the melting point of urea, preferably around 140-160° C., more preferably around 150° C.

In a preferred embodiment said carbon nanotubes with attached functional groups containing oxygen atoms have been mixed with urea and then heated to a temperature such that urea, or decomposition products thereof, react to modify said oxygen-containing functional groups and/or polymerize to introduce new functional groups such as —$CONH_2$ and —$CONHCONH_2$, which make the carbon nanotubes soluble in polar solvents such as water or a $C_1$-$C_3$ alcohol.

In a preferred embodiment an aldehyde, preferably a benzaldehyde, such as para-anisaldehyde, has been added to the urea to modulate said modification and/or polymerization reactions.

Preferably, said metal cation Me is selected from the group of metal ions comprising $Ag^{1+}$, $Mg^{2+}$, $Ca^{2+}$, $Sr^{2+}$, $Ba^{2+}$, $Mn^{2+}$, $Fe^{2+}$, $Co^{2+}$, $Ni^{2+}$, $Cu^{2+}$, $Zn^{2+}$, $Cd^{2+}$, $Sn^{2+}$, $Pb^{2+}$, $Eu^{2+}$, $Sc^{3+}$, $Y^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, and $Lu^{3+}$, and $Bi^{3+}$. These metal cations are known to form Me-carbonates that are insoluble in polar solvents or soluble to only a negligible extent therein, as defined further above.

In one embodiment, said Me-carbonate has the empirical formula $(Me)_x(CO_3)_y(OH)_z$, wherein Me is a divalent metal cation, preferably $Ca^{2+}$ or $Mg^{2+}$ or a combination of $Ca^{2+}$ and $Mg^{2+}$, and x, y, and z have integral values satisfying the equation $x=y+z/2$ including $z=0$, wherein preferably said Me-carbonate is $CaCO_3$. Preferably, said $CaCO_3$ comprises an amorphous or crystalline phase of $CaCO_3$ or combinations thereof.

In one embodiment, said metal cation Me is selected from the group comprising simple monomeric oxo-cations having the general formula $MO_n^{m+}$, wherein n=1 or 2 and m=1, 2 or 3, O represents oxygen, and M represents a metal selected from V (vanadium) and U (uranium). Preferably, when M=V, said oxo-cation is $VO^{2+}$ (vanadyl ion), and when M=U, said oxo-cation is $UO_2^{2+}$ (uranyl ion). These ions contain MO units in which the metal-oxygen bond(s) is essentially a double bond (i.e., M=O) and which can persist through a variety of chemical reactions. The dipolar nature of the metal-oxygen bond produces a partial negative charge on the oxygen atom and promotes hydrogen bonding possibilities between the oxygen atom(s) of the metal oxo-cation and hydrogen bond donating groups (Franczyk et al., *Journal of the American Chemical Society* 114, 8138 (1992)). Furthermore, the uranyl ion is known to form very stable complexes with carbonate ion ($CO_3^{2-}$) as well as carboxylate groups (—$COO^-$) (Franczyk et al., *Journal of the American Chemical Society* 114, 8138 (1992)). The vanadyl ion also forms stable complexes with various compounds containing carboxylate groups (Selbin, *Chemical Reviews* 65, 153 (1965); Garribba et al., *Inorganic Chemistry* 42, 3981 (2003)). These considerations lead to the expectation that the carbonate compounds of simple monomeric oxo-cations such as $VO^{2+}$ and $UO_2^{2+}$, like metal cations such as $Ca^{2+}$, can form composite materials with carbon nanotubes with attached functional groups containing oxygen atoms such as —COOH, —OH, —$CONH_2$, and/or —$CONHCONH_2$.

In one embodiment, said carbon nanotubes within the composite material comprise 0.01-10%, preferably 0.2-5%, of the total weight of solids in the composite material. Preferably, the composite material according to the present invention is on a substrate.

In a preferred embodiment the composite material according to the present invention has been produced by precipitation from solution, wherein, preferably it has been precipitated from solution and collected, preferably by centrifugation. In one embodiment, said composite material, after collection, is then deposited onto a substrate.

In one embodiment, said composite material is dried and is in the form of a powder. The powder is free-flowing in the sense that it can be poured. Preferably said powder has a primary particle size in the range of from 0.1 μm to 100 μm, wherein the term "primary particle" refers to the smallest particles of the composite material that are discernible by microscopy. The primary particles may form larger aggregates.

Preferably, during centrifugation, the centripetal force exerted on said composite material is in the range of from 0.1 N to 1000 N, preferably 0.1 N to 100 N, more preferably 0.5 N to 50 N and most preferably 1 N to 40 N. In one embodiment, during centrifugation, the centripetal pressure exerted on said composite material is in the range of from 0.01 MPa to 5 MPa, preferably 0.01 MPa to 4 MPa, more preferably from 0.02 MPa to 3 MPa, and most preferably from 0.06 MPa to 2 MPa.

In one embodiment, said composite material has been produced by precipitation from solution, said precipitation comprising the step: combining a dispersion of carbon nanotubes in a polar solvent with a non-carbonate salt of Me and a source of carbonate ion, wherein said polar solvent is preferably water or a $C_1$-$C_3$ alcohol.

Preferably said precipitation comprises the step: combining a dispersion of carbon nanotubes in a first polar solvent with a powder of Me-carbonate or a dispersion of Me-carbonate in a second polar solvent, wherein said first and said second polar solvents are preferably selected from water and a $C_1$-$C_3$ alcohol, and wherein, more preferably said first and said second polar solvents are the same.

In one embodiment said composite material is deposited onto a substrate as a suspension.

In one embodiment, it is directly precipitated from solution onto a substrate.

Preferably, said composite material, when in the form of a suspension, has a primary particle size in the range of from 0.1 μm to 100 μm, wherein the term "primary particle" refers to the smallest particles of the composite material which are discernible by microscopy. The primary particles may form larger aggregates ("secondary particles").

Preferably, said substrate is made of a material selected from the group comprising glass, silicon, semiconductor, metal, semi-metal, plastic, electrically conductive glass, electrically conductive polymer, ceramic, textile, cellulose, starch, tooth, cartilage, tendon, and bone.

Preferably, said substrate is a patterned substrate.

In one embodiment, said Me-carbonate in said composite material is further processed by partially or completely transforming it into another Me-salt by exposing the composite material to an acid, thus producing said Me-salt, wherein, preferably, after transformation of said Me-carbonate into another Me-salt, said composite material is treated, preferably rinsed, with a polar solvent, such as water or a $C_1$-$C_3$ alcohol, thus removing said another salt. Preferably said acid is an aqueous solution, more preferably an aqueous solution of a mineral acid, even more preferably hydrochloric acid or sulfuric acid. In another embodiment, however, said acid is a concentrated mineral acid, such as concentrated hydrochloric or sulfuric acid, and the exposure to the acid occurs by exposure to acidic fumes.

In one embodiment, said composite material having undergone said exposure to an acid comprises carbon nanotube shells which, preferably, have an average length in all three dimensions in the range of from 1 μm to 100 μm, more preferably 5 μm to 30 μm. Such shells are believed to comprise an outer part, consisting of mainly carbon nanotubes, and an internal volume, consisting of mainly salts, solvent and other non-nanotube components. These shells, in general, appear to adopt the overall shape of the crystals of the Me-carbonate or the another Me-salt (after acid exposure). The present invention envisages that such shells can be used as vesicles for transporting substances in their internal volume.

In one embodiment, said composite material is dried, preferably on a substrate, after transformation of said Me-carbonate into another Me-salt. Preferably, such a dried composite material comprises at least one carbon nanotube layer, preferably on a substrate. Such a carbon nanotube layer is herein also sometimes referred to as a carbon nanotube "mat". It is believed that said shells, upon drying on a substrate, collapse and flatten thereby forming "mats".

In one embodiment, said Me-carbonate in said composite material is further processed by partially or completely transforming it into a metal or metal oxide by heating.

In one embodiment the Me-carbonate in said composite material is further processed by partially or completely transforming it into a metal or metal hydride by reduction. This may occur directly or via the metal oxide.

The objects of the present invention are also solved by a method of forming a carbon nanotube composite material comprising the steps:
a) providing carbon nanotubes
b) dispersing the carbon nanotubes in a polar solvent, preferably water or a $C_1$-$C_3$ alcohol
c) introducing metal cations and carbonate anions into said polar solvent containing dissolved carbon nanotubes, and
d) co-precipitating a Me-carbonate and said carbon nanotubes, wherein Me represents a metal cation, preferably a divalent cation, more preferably a mixture of different metal cations, most preferably $Ca^{2+}$ or $Mg^{2+}$ or a combination of $Ca^{2+}$ and $Mg^{2+}$, thereby forming a carbon nanotube composite material comprising said Me-carbonate.

In one embodiment step b) occurs by endowing said carbon nanotubes with functional groups, such as —COOH, —OH, —$CONH_2$, and/or —$CONHCONH_2$, which make the carbon nanotubes dispersible in polar solvents, such as water or a $C_1$-$C_3$ alcohols, preferably methanol or ethanol, and dispersing such functionalized carbon nanotubes in such polar solvent.

Preferably, step b) occurs by mixing said carbon nanotubes with urea and melting the urea, said melting occurring optionally in the presence of an aldehyde, preferably a benzaldehyde, such as para-anisaldehyde, and thereafter dispersing such functionalized carbon nanotubes in a polar solvent, such as water or a $C_1$-$C_3$ alcohol, preferably methanol or ethanol.

In one embodiment steps c) and d) occur by dissolving a non-carbonate salt of Me in said polar solvent containing said functionalised carbon nanotubes and exposing said solution to gaseous ammonium carbonate, or a mixture of gaseous ammonia and carbon dioxide, thereby co-precipitating a composite material comprising said carbon nanotubes and said Me-carbonate.

Preferably, said non-carbonate salt of Me comprises monovalent, divalent or trivalent metal cations, more preferably divalent cations, even more preferably $Ca^{2+}$ or $Mg^{2+}$ or a combination of $Ca^{2+}$ and $Mg^{2+}$, wherein, preferably, said non-carbonate salt of Me is a calcium salt, preferably $CaCl_2$.

In one embodiment, steps c) and d) occur by combining with said dispersion of carbon nanotubes in a polar solvent firstly a carbonate salt of a monovalent cation, or solution thereof, and secondly a non-carbonate salt of Me, or solution thereof, or by combining with said dispersion of carbon nanotubes in a polar solvent firstly a non-carbonate salt of Me, or solution thereof, and secondly a carbonate salt of monovalent metal cation, or solution thereof, wherein Me represents a cation, preferably a divalent cation, more preferably $Ca^{2+}$ or $Mg^{2+}$ or a combination of $Ca^{2+}$ and $Mg^{2+}$, thereby co-precipitating a composite material comprising said carbon nanotubes and said Me-carbonate.

Preferably, said carbonate salt of a monovalent cation is $Na_2CO_3$ and said non-carbonate salt of Me is $CaCl_2$.

In another embodiment steps c) and d) occur by combining with said dispersion of carbon nanotubes in a polar solvent, in any order, urea, or a solution thereof, and a non-carbonate salt of Me, or solution thereof, wherein Me represents a metal cation, preferably a divalent cation, more preferably $Ca^{2+}$ or $Mg^{2+}$ or a combination of $Ca^{2+}$ and $Mg^{2+}$, and thereafter heating said solution or dispersion, resultant out of such combining, to facilitate decomposition of urea, thereby co-precipitating a composite material comprising said carbon nanotubes and said Me-carbonate.

In one embodiment, steps c) and d) occur by combining with said dispersion of carbon nanotubes in a polar solvent, in any order, urea, or a solution thereof, and a non-carbonate salt of Me, or solution thereof, wherein Me represents a metal cation, preferably a divalent cation, more preferably $Ca^{2+}$ or $Mg^{2+}$ or a combination of $Ca^{2+}$ and $Mg^{2+}$, and urease, or a solution thereof, to facilitate decomposition of urea, thereby co-precipitating a composite material comprising said carbon nanotubes and said Me-carbonate.

Preferably, said Me-carbonate is $CaCO_3$ and said non-carbonate salt of Me is $CaCl_2$.

In one embodiment said co-precipitation of said Me-carbonate and said carbon nanotubes occurs in the presence of a substrate.

The objects of the present invention are also solved by a method of forming a carbon nanotube composite material comprising the steps:
a) providing carbon nanotubes,
b) dispersing the carbon nanotubes in a polar solvent, preferably water or a $C_1$-$C_3$ alcohol,
c) providing a dispersion of Me-carbonate particles, preferably of finely divided Me-carbonate particles, in a polar solvent, preferably water or a $C_1$-$C_3$ alcohol,
d) combining said dispersion of carbon nanotubes with said dispersion of Me-carbonate particles, thereby forming a carbon nanotube composite material comprising said carbon nanotubes adsorbed to the surfaces of said Me-carbonate particles.

In one embodiment step b) occurs by endowing said carbon nanotubes with functional groups, such as —COOH, OH, —$CONH_2$, and/or —$CONHCONH_2$, which make the carbon nanotubes dispersible in polar solvents, such as water or a $C_1$-$C_3$ alcohol, preferably methanol or ethanol, and dispersing such functionalized carbon nanotubes in such polar solvent.

Preferably step b) occurs by mixing said carbon nanotubes with urea and melting the urea, said melting occurring optionally in the presence of an aldehyde, preferably a benzaldehyde such as para-anisaldehyde, and thereafter dispersing such functionalized carbon nanotubes in a polar solvent, such as water or a $C_1$-$C_3$ alcohol, preferably methanol or ethanol.

In one embodiment, said dispersion of Me-carbonate particles in a polar solvent in step c) is freshly prepared by mixing a solution of soluble non-carbonate salt of Me with a solution of soluble carbonate salt of a monovalent cation, wherein the solvent for both solutions is preferably water.

Preferably said soluble non-carbonate salt of Me comprises preferably monovalent, divalent or trivalent metal cations, more preferably divalent cations, even more preferably $Ca^{2+}$ or $Mg^{2+}$ or a combination of $Ca^{2+}$ and $Mg^{2+}$.

In one embodiment, said soluble non-carbonate salt of Me is a calcium salt, preferably $CaCl_2$.

Preferably said soluble carbonate salt of a monovalent cation is $Na_2CO_3$.

In one embodiment, said dispersion of Me-carbonate particles in a polar solvent in step c) is freshly prepared by dispersing precipitated calcium carbonate powder in said polar solvent, preferably water.

In one embodiment said carbon nanotube composite material comprising said Me-carbonate is precipitated from solution and collected, preferably by centrifugation. In one embodiment, after collection, the composite material is then deposited on a substrate.

In a preferred embodiment, the centripetal force and/or centripetal pressure exerted on the composite material is as outlined above.

Preferably, said carbon nanotube composite material comprising said metal carbonate is deposited onto a substrate as a suspension and allowed to dry.

In one embodiment, said adsorption of carbon nanotubes to Me-carbonate particles of step d) occurs on a substrate.

In one embodiment said substrate is made of a material selected from the group comprising glass, silicon, semiconductor, metal, semi-metal, plastic, electrically conductive glass, electrically conductive polymer, ceramic, textile, cellulose, starch, tooth, cartilage, tendon, and bone.

Preferably, a surface of said substrate is primed with functional groups, preferably —COOH groups, that bind to a Me-carbonate by a coordinative bond and/or hydrogen bond formation.

More preferably, said substrate is a patterned substrate, wherein, preferably, said substrate is patterned with functional groups that bind to a Me-carbonate by a coordinative bond and/or hydrogen bond formation, preferably —COOH groups, and functional groups that do not bind to a Me-carbonate by a coordinative bond and/or hydrogen bond formation, preferably —$CH_3$ groups.

In one embodiment, said carbon nanotube composite material comprising a Me-carbonate is subjected to forces causing said material to fracture, preferably by grinding, by application of pressure or ultrasound, or by thermal shock, wherein, preferably, said carbon nanotube composite material comprising a Me-carbonate on a substrate is subjected to pressure, wherein said pressure is sufficient to break said carbon nanotube composite material into fragments.

The amount of pressure to be exerted in order to break the composite material can be easily determined by someone skilled in the art without undue experimentation. Usually a pressure with a strength that can be exerted manually suffices.

In one embodiment said Me-carbonate in said carbon nanotube composite material comprising a Me-carbonate is further processed by partially or completely transforming it into a carbonated hydroxyapatite by hydrothermal treatment with a solution of a phosphate salt of a monovalent cation, preferably dibasic ammonium phosphate (($NH_4)_2HPO_4$).

In one embodiment said Me-carbonate in said composite material is further processed by partially or completely transforming it into a metal or metal oxide by heating. It is generally known that Me-carbonates decompose thermally to the metal oxide and carbon dioxide. For example, $Ag_2CO_3$ decomposes at about 220° C. into $Ag_2O$ and $CO_2$, and at higher temperatures metallic Ag is formed (*Merck Index* $12^{th}$ ed., #8650). Such metal oxides or metals have applications in catalysts, sensors, optical devices, etc., which may be combined with the exceptional properties of the carbon nanotubes in the heat-treated composite material.

In one embodiment said Me-carbonate in said composite material is further processed by partially or completely transforming it into a metal or metal hydride by reduction. The reduction may occur directly or via the metal oxide. The reaction products of such transformation by reduction may be useful as catalysts or as anode or cathode materials in electrochemical devices such as batteries, fuel cells, or capacitors. Reduction can be achieved e.g. by using hydrogen under elevated temperature and/or pressure. Such reductions are commonly known to someone skilled in the art.

In one embodiment said Me-carbonate in said composite material is further processed by partially or completely transforming it into another Me-salt by exposing said composite material to an acid, thus producing said Me-salt, wherein, preferably, said acid is a mineral acid such as hydrochloric acid, sulfuric acid, nitric acid, or perchloric acid, or an organic acid with a $pK_a$ less than 2 such as trifluoroacetic acid or toluenesulfonic acid, to decompose all or part of said Me-carbonate component, wherein, preferably, said carbon nanotube composite material, after exposure to an acid, is treated, preferably rinsed with water or a $C_1$-$C_3$ alcohol. In some embodiments, said acid is concentrated acid, and exposure thereto occurs by exposure to acidic fumes. In other embodiments said acid is an aqueous solution.

In one embodiment, said composite, after transformation of said Me-carbonate into another Me-salt, is treated, preferably rinsed with a polar solvent such as water or a $C_1$-$C_3$ alcohol, and, optionally, dried, or is dried and treated, preferably rinsed, with a polar solvent, such as water or a $C_1$-$C_3$ alcohol, thus removing said other Me-salt.

Preferably, the exposure to an acid occurs over a period of 0.1-60 minutes, preferably 1-10 minutes.

In one embodiment, said acid is an aqueous solution, preferably an aqueous solution of hydrochloric acid or sulfuric acid. In embodiment, said acid is gaseous, preferably gaseous hydrochloric acid.

In one embodiment said composite material has been deposited on a substrate, wherein, preferably, after deposition of said composite material on a substrate, an adhesive tape is applied to said composite material and then removed again, thereby lifting off some composite material. Preferably, said composite material having undergone the application of an adhesive tape and subsequent lifting thereof, remains at least in part on said substrate and comprises vertically oriented carbon nanotube bundles, vertically oriented with respect to the substrate. In a preferred embodiment, the density of vertically oriented nanotube bundles is such that the average distance between adjacent vertically oriented nanotube bundles is of approximately the same size as their average length.

More preferably after exposure to an acid, an adhesive tape is applied on said carbon nanotube composite material and removed again, thereby lifting off some material.

The objects of the present invention are also solved by a carbon nanotube composite material, produced by the method according to the present invention, preferably by the method involving a substrate, or alternatively by the method involving application of forces causing the material to fracture, or alternatively by the method involving a subsequent transformation of the Me-carbonate, or alternatively by the method involving an acid treatment, or by the method involving a combination of any of the aforementioned steps.

In a preferred embodiment the carbon nanotube composite material according to the present invention contains a crystalline Me-carbonate component.

The objects of the present invention are also solved by the use of a carbon nanotube composite material according to the present invention as electron sources in applications such as flat panel displays, vacuum fluorescence displays, parallel electron beam microscopy, nanolithography, gas ionization sensors, portable x-ray tubes, and compact microwave amplifiers. The objects of the present invention are further solved by the use of a carbon nanotube composite material according to the present invention as a conductive coating, a lighting element, or in a microelectronic device, in an electrochemical device, such as a battery, fuel cell, or capacitor, in a sensor, preferably a chemical or electrochemical sensor, or a touch sensor, in an actuator, in a biomedical, device, for hard or soft tissue replacement, and/or as a support for biological cell growth, preferably for bone or teeth replacement, for neuronal growth, or in an artificial muscle, in an electrically conductive layer, in electrophoretic ink, as a scaffold for the regeneration of bone, tooth or cartilage, or for the surface treatment of implanted biomedical materials or devices.

The inventors have surprisingly found that, by using a co-precipitation process it is possible to form a composite of carbon nanotubes, which composite additionally contains a metal carbonate. The inventors have also surprisingly found that, by using an adsorption process, it is possible to form a composite of carbon nanotubes, which composite additionally contains a metal carbonate. One prerequisite for such co-precipitation is that the carbon nanotubes have previously been made soluble in a polar solvent, such as an aqueous solution, which solubilization can be achieved by endowing the carbon nanotubes with polar functional groups. A way of achieving such functionalization is a urea-melt process, as has for example been described in European patent application EP 02 027 863.6 and in PCT-application Number PCT/EP03/10600. The contents of these applications are included hereby in their entirety by reference.

The urea-melt process for solubilizing carbon nanotubes produces nanotubes to which polar organic functional groups comprising oxygen and nitrogen atoms, including amide, urea, and/or carbamate groups, are attached. These groups, which make the nanotubes soluble in polar solvents such as water and methanol, can interact with calcium carbonate via hydrogen bonding between carboxylate oxygen atoms of calcium carbonate and NH groups of the amide and/or urea functional groups in a similar way as the polymers investigated by Ueyama et al. (*Macromolecules* 34, 2607 (2001)). The results obtained by the examples provided below show that crystalline composites of the urea-melt processed CNTs and calcium carbonate are readily obtained by a simple co-precipitation or adsorption processes. The formation of CNT-$CaCO_3$ crystalline composites represents a new way of concentrating and organizing CNTs via self-assembly. Since individual particles comprise the powder obtained by precipitation, they can be manipulated and positioned individually, by, for example, mechanical or electrophoretic means. The present inventors anticipate that such composites can also be grown or deposited at selective locations on patterned substrates in a similar way as demonstrated by the experiments of Aizenberg et al. (*Nature* 398, 495 (1999); *Journal of the American Chemical Society* 121, 4500 (1999); *Science* 299, 1205 (2003)) and Han et al. (*Langmuir* 18, 182 (2002)). Such composites may be used in medical or biomedical applications, such as tissue engineering or as supports for biological cell growth. The $CaCO_3$ component can be easily removed partially or completely by, for example, treating the composites with acid. The present inventors further anticipate that the remaining CNT assemblies or networks, which retain organized structures, may be useful as components for diverse applications including thin-film transistors, sensors, and electrodes in fuel cells, batteries, and capacitors. Herein the present inventors demonstrate the use of CNT-$CaCO_3$ crystalline composites for fabrication cathodes for field emission devices via a low-temperature process compatible with glass and polymer substrates.

Preferred Embodiment (Best Mode of the Invention)

According to a preferred embodiment, crystalline composite materials containing carbon nanotubes (CNTs) and calcium carbonate ($CaCO_3$) are prepared in three ways:
1. An aqueous dispersion of calcium chloride and CNTs is exposed to gaseous ammonium carbonate. The precipitated composite material is collected by centrifugation and comprises crystalline calcium carbonate and CNTs.
2. An aqueous solution of sodium carbonate is mixed with an aqueous solution of calcium chloride to produce microparticles comprising amorphous calcium carbonate and then an aqueous dispersion of CNTs is added. The precipitated composite material is collected by centrifugation and comprises crystalline calcium carbonate and CNTs.
3. An aqueous dispersion of CNTs is mixed with an aqueous suspension of precipitated calcium carbonate powder. The composite material is collected by centrifugation and comprises crystalline calcium carbonate and CNTs.

Such crystalline composites of carbon nanotubes have not been previously described and have diverse technical applications, which utilize the composite as prepared or after chemical transformation. In particular, cathodes exhibiting electron field emission are prepared by 1) precipitating CNT-$CaCO_3$ composites from solution, 2) depositing the precipitates on electrically conductive substrates, and 3) treating the substrate surface with adhesive tape to remove loosely adhering portions of the composite and to lift the CNTs that remain attached to the substrate surface. The precipitation step 1) may involve centrifugation. Furthermore, the process may involve an additional step of exposing the composite material to an acid to decompose all or part of the $CaCO_3$ component before the adhesive tape treatment in step 3). Furthermore, the substrate may be subjected to a drying process (e.g., heat and/or vacuum) after the acid treatment and before the adhesive tape treatment in step 3).

The term "carbon nanotubes" (CNTs), as used herein, is generally meant to signify hollow graphitic carbon tubes which are preferably terminated at each end by a hemispherical cap. The dimensions are variable. Single-walled carbon nanotubes (SWNTs) have diameters from 4 angstroms (Å) to several nanometers (nm) and can be micrometers (µm) long or longer. SWNTs typically aggregate side by side into rope-like structures that are often referred to as "ropes" or "bundles". Multi-walled carbon nanotubes (MWNTs) comprise more than one concentric layer of carbon forming the tube. Carbon nanotubes, according to the present invention, can be SWNTs, MWNTs, double-walled carbon nanotubes (DWNTs), few-walled carbon nanotubes (FWNTs), bucky tubes, carbon filaments, and combinations thereof. Such carbon nanotubes can be made by techniques known to someone skilled in the art, and they can be further optionally purified. Such carbon nanotubes can exhibit varying electrical properties (depending on the way the graphite structure spirals around the tubes, and other factures), and can be insulating, semiconducting or conducting (metallic or semi-metallic). In some embodiments, the carbon nanotubes are chemically modified and/or functionalized.

The abbreviation SWNT, as used herein, is meant to signify single-walled carbon nanotubes. The abbreviation U-SWNT, as used herein, is meant to signify single-walled carbon nanotubes that have been subjected to a urea melt and have thus been solubilized. The term UA-SWNT, as used herein, is meant to signify single-walled carbon nanotubes, subjected to a urea-melt, wherein a benzaldehyde, preferably para-anisaldehyde was present in the urea melt.

Generally, as used herein, the term "composite material" is meant to signify a material comprising several components; however, it is also meant to include those materials wherein, in the cause of further events or reactions, one or several components is transformed into other substances or disappear, as a result of which there may only be one component left. For example, a composite material according to the present invention may also be a material comprising carbon nanotubes only wherein a Me-carbonate component may have been present initially or at the same stage but then vanished due to e.g. evaporation or combustion or treatment by acid.

According to the present invention, preferably, functional groups containing oxygen atoms, such as carboxylic acid (—COOH) and alcohol/phenol (—OH) groups, are attached to the carbon nanotubes. Commonly used methods for purifying carbon nanotubes that involve oxidizing agents/conditions, such as refluxing nitric acid or heating in air, cause the formation of such oxygen-containing functional groups by chemical modification of the nanotubes, especially at the ends and at defects in the sidewalls. Functional groups such as these can also be attached to carbon nanotubes indirectly, i.e., by non-covalent adsorption of compounds containing functional groups. Compounds that are known to adsorb to the sidewalls of carbon nanotubes include planar aromatic molecules (pyrene derivatives, porphyrins derivatives, etc.), polymers (poly-phenylenevinylene, polyvinyl alcohol, etc.), and surfactants (sodium dodecylsulfate, amphiphilic peptides (Dieckmann et al., *Journal of the American Chemical Society* 125, 1770 (2003)), etc.). A third way of introducing oxygen-containing functional groups onto carbon nanotubes is by covalent attachment using reagents such as nitrenes or diazonium derivatives. Several review articles summarizing various methods of attaching functional groups to carbon nanotubes are available (Sun et al., *Accounts of Chemical Research* 35, 1096 (2002); Niyogi et al., *Accounts of Chemical Research* 35, 1105 (2002); Hirsch, *Angewandte Chemie International Edition* 41, 1853 (2002); Bahr and Tour, *Journal of Materials Chemistry* 12, 1952 (2002)).

Functional groups such as —COOH and —OH are desirable for implementation of the present invention for two reasons. One reason such groups are desirable is that they improve the solubility of the carbon nanotubes in aqueous or organic solvents. Solubility, in this context, is understood to not necessarily mean true molecular dispersion, but rather may refer to a colloidal dispersion in which several or many individual carbon nanotubes are associated into what is referred to as "bundles" or "ropes". Nevertheless, at least the functional groups of carbon nanotubes on the outer surfaces of such bundles are accessible to ions and other molecules.

The other reason that functional groups containing oxygen atoms are desirable for implementation of the present invention is that they can serve as bridges that connect the nanotubes to the metal carbonate in the composite material. Without wishing to be bound by any theory, two scenarios, which may happen independently or simultaneously, are envisaged to occur when carbon nanotube composite materials comprising metal carbonates are being produced. In one scenario, adsorption of metal ions by the nanotubes leads to high local concentrations of metal ions at the nanotube surface, thereby promoting surface deposition of the metal carbonate locally. In the other scenario, the nanotubes adsorb to metal carbonate particles or crystallites that have already been nucleated in the bulk of the solvent. In either case, the nanotubes become incorporated into the metal carbonate matrix as it continues to grow, producing the composite material. Ultimately, when the size of the particles comprising the composite material is large enough, the particles precipitate. The inventors, refer to the overall process, i.e., surface deposition of the metal carbonate on the carbon nanotubes and/or adsorption of carbon nanotubes onto metal carbonate particles or crystallites followed by incorporation of the nanotubes into the metal carbonate matrix followed by precipitation of the composite material as "co-precipitation". It is recognized that the metal carbonate component may not be formed in its most thermodynamically favored phase initially during co-precipitation, but may subsequently transform into a more stable phase as a result of time or external forces such as heat or pressure, such as centripetal force during centrifugation.

In a third embodiment of the present invention, the carbon nanotubes are added to a suspension comprising particles of the metal carbonate in a thermodynamically stable phase. The carbon nanotubes adsorb to metal carbonate particles due to interactions between the functional groups containing oxygen atoms on the nanotubes and the metal carbonate surface, forming the composite material comprising metal carbonate and nanotubes.

Metal ions that form stable carbonate compounds generally tend to form their most stable compounds with oxygen-rich ligands. The "hard and soft acids and bases" (HSAB) principle (Pearson, *Journal of the American Chemical Society* 85, 3533 (1963)) states that metal ions and ligands can be classified as "hard" or "soft" according to their polarizability; hard (nonpolarizable) metal ions bind strongly to hard ligands, and vice-versa. Hard metal ions have relatively small, dense cores of positive charge; these include $Ca^{2+}$ and $Mg^{2+}$. Hard ligands have relatively small, highly electronegative donor atoms (the ones bonded to the metal ion); these include O and N. The affinity of $Ca^{2+}$ and $Mg^{2+}$ ions for oxygen-containing ligands is the reason why these ions are adsorbed by carbon nanotubes that are functionalized with oxygen-containing groups such as —COOH and —OH. Likewise, it is the reason why the functionalized nanotubes are adsorbed onto the metal carbonate particles or crystallites, whose surfaces comprise a lattice of Me and carbonate ions. In addition to such metal-ligand coordinative bonding interactions, hydrogen bonding is also likely to contribute to the forces involved during co-precipitation of the composite material comprising carbon nanotubes and Me-carbonate. Schematic diagrams illustrating how functional groups containing oxygen atom can serve as bridges between the carbon nanotubes and calcium carbonate in the composite material produced according to the embodiments of the present invention are indicated in FIG. 1.

Besides the hydrogen bonding indicated in FIG. 1, electrostatic (Coulombic) interactions might also contribute to the bonding between the carbon nanotube and calcium carbonate components within the composite. On one hand, carbon nanotubes tend to be negatively charged in neutral, salt-free aqueous solutions (Nagahara et al., *Applied Physics Letters* 80, 3826 (2002)), perhaps because of polarization of water molecules via charge-transfer interactions or the formation of —OH . . . π hydrogen bonds, as in the case of fullerene clusters (Andrievsky et al., *Chemical Physics Letters* 364, 8 (2002); Chaplin, "Water Structure and Behavior", http://www.lsbu.ac.uk/water/). On the other hand, the surface charge of polycrystalline calcium carbonate (calcite) in water tend to be positively charged when the pH is below the point of zero charge, $pH_{pzc}$ ~8.2 (Salinas-Nolasco et al., *Journal of Colloid and Interface Science* 274, 16 (2004)). Therefore, attractive electrostatic interactions between carbon nanotubes and calcium carbonate are likely to occur in near-neutral aqueous suspension and be favorable for formation of $CNT-CaCO_3$ composite materials.

In one embodiment of the present invention, carbon nanotubes with attached functional groups containing oxygen atoms are mixed with urea and then heated to a temperature greater than the melting point of urea, preferably ~150° C., wherein decomposition products of urea react to modify said oxygen-containing functional groups and/or polymerize to introduce new functional groups such as —$CONH_2$ and —$CONHCONH_2$. This process makes the carbon nanotubes more soluble in polar solvents such as water and generates additional functional groups that can serve as bridges between the carbon nanotubes and the Me-carbonate. Optionally, an aldehyde, preferably a benzaldehyde such as para-anisaldehyde, has been added to the molten urea to modulate said modification and/or polymerization reactions.

Preferably, the Me-carbonate is calcium carbonate ($CaCO_3$).

Three crystalline forms of anhydrous $CaCO_3$ occur naturally, as well as an amorphous form, which is hydrated. The three crystalline polymorphs are calcite, aragonite, and vaterite. The particular polymorph and morphology that is produced when calcium carbonate is precipitated from solution depends on a number of factors, including the presence of organic molecules and other metal ions in the solution (Review: Cölfen, *Current Opinion in Colloid and Interface Science* 8, 23 (2003)). In general, amorphous calcium carbonate (ACC) is the precursor to the formation of more stable crystalline forms when $CaCO_3$ is precipitated from supersaturated solutions prepared by reaction of $Ca^{2+}$ and $CO_3^{2-}$ (Pontoni et al., *Journal of Physical Chemistry B* 107, 5123 (2003)). Calcite, distinguished by rhombohedral crystals, is thermodynamically favored over aragonite and vaterite under ambient conditions. The presence of $Mg^{2+}$ favors growth of the aragonite polymorph (Raz et al., *Advanced Materials* 12, 38 (2000); Meldrum and Hyde, *Journal of Crystal Growth* 231, 544 (2001)), while the presence of water-miscible alcohols (ethanol, isopropanol, diethylene glycol) favors the vaterite polymorph by preventing its transformation into calcite (Manoli and Dalas, *Journal of Crystal Growth* 218, 359 (2000)).

Various methods exist for producing $CaCO_3$ by precipitation from solution. Generally speaking, each involves mixing an aqueous solution of a water-soluble salt of $Ca^{2+}$ with a source of carbonate ion ($CO_3^{2-}$). Also, generally speaking, the nature of the $Ca^{2+}$-salt is not a critical factor, although, as indicated above, certain organic anions may influence the crystal form of the calcium carbonate that is precipitated.

Suitable salts of $Ca^{2+}$ for producing $CaCO_3$ by precipitation from aqueous solution include the chloride ($CaCl_2$ or a hydrate thereof), the nitrate ($Ca(NO_3)_2$ or a hydrate thereof), the acetate ($Ca(CH_3COO)_2$ or a hydrate thereof), and the perchlorate ($Ca(ClO_4)_2$ or a hydrate thereof). Since the chloride, nitrate, and perchlorate salts are also appreciably soluble in $C_1$-$C_3$ alcohols (methanol, ethanol, 1-propanol, isopropanol, etc.), these alcohols or alcohol-water mixtures may also be used as solvent instead of water for the precipitation of $CaCO_3$, according to the present invention. However, as indicated above, the presence of a $C_1$-$C_3$ alcohol may influence the crystal form of the calcium carbonate that is precipitated.

Several sources of carbonate ion have been used for producing $CaCO_3$ by precipitation from aqueous solution of a water-soluble salt of $Ca^{2+}$ and can also be used for the purposes of the present invention. Generally speaking, these are either water-soluble salts of carbonate ion or a combination of $CO_2$ and base. Suitable water-soluble carbonate salts include those with alkali metal ions (e.g., $Na_2CO_3$ (Kawano et al., *Journal of Crystal Growth* 237-239, 419 (2002))) or ammonium ion (($NH_4)_2CO_3$ (Dickinson et al., *Journal of Crystal Growth* 244, 369 (2002)). The corresponding salts of bicarbonate ion ($HCO_3^-$) may also be used. $CaCO_3$ is prepared commercially by bubbling $CO_2$ through an aqueous slurry of slaked lime ($Ca(OH)_2$).

Another method of providing carbonate ion is by vapor diffusion from solid ammonium carbonate (($NH_4)_2CO_3$) (Raz et al., *Advanced Materials* 12, 38 (2000)). When it vaporizes, ammonium carbonate can dissociate into $CO_2$ and ammonia. The $CO_2$ becomes hydrated to carbonic acid ($H_2CO_3$) when it dissolves in water, while the $NH_3$ serves as a base to deprotonate the carbonic acid to carbonate and/or bicarbonate ion.

Spherical porous microparticles (4-6 μm) comprised of amorphous $CaCO_3$ nanoparticles, are prepared by the rapid pouring of 0.33 M $Na_2CO_3$ solution into an equal volume of 0.33 M $CaCl_2$ solution at room temperature; >80% of the microparticles transform into rhombohedral calcite microcrystals when they are stored overnight in water at room temperature (Volodkin et al., *Biomacromolecules* 5, 1962 (2004)). Amorphous calcium carbonate spheres are also obtained when calcium carbonate is precipitated slowly, on a timescale of minutes to hours, by the release of carbon dioxide via base-catalyzed hydrolysis of dimethyl carbonate in aqueous solutions of calcium chloride (Faatz et al., *Advanced Materials* 16, 996 (2004)).

In one embodiment of the present invention, a solution of carbon nanotubes is added to a freshly formed suspension of spherical porous microparticles comprising amorphous $CaCO_3$ nanoparticles. Without wishing to be bound by any mechanism, the inventors think that the CNTs adsorb rapidly to the microparticles as a result of interactions between functional groups containing oxygen atoms on the CNTs and the $CaCO_3$ particle surface, as described above. The amorphous $CaCO_3$ microparticles transform spontaneously into rhombohedral shaped crystalline $CaCO_3$ particles, and the CNTs are simultaneously incorporated into the resultant particles forming a crystalline CNT-$CaCO_3$ composite material. The transformation of the $CaCO_3$ from its amorphous to crystalline phase occurs spontaneously because the crystalline phase is thermodynamically more stable, but external forces such as centripetal forces during centrifugation can accelerate the rate of transformation. The ratio between the CNT and $CaCO_3$ components in the composite is readily controlled by the relative amounts of amorphous $CaCO_3$ microparticles in the suspension and CNTs in the solution added to the suspension. The processes involved in preparing the CNT-$CaCO_3$ composite according to this embodiment are schematically illustrated in FIG. 2.

Another method for providing a source of carbonate for precipitation of $CaCO_3$ is by decomposition of urea ($NH_2CONH_2$). Uniform needle-like crystals of the aragonite form of $CaCO_3$ are obtained by aging (2.5-72 hours) aqueous solutions of calcium salts in the presence of urea at 90° C. (Wang et al., *Journal of Colloid and Interface Science* 218, 545 (1999)). Urea decomposes under such conditions to provide $CO_2$ and ammonia, which, as noted above, provides a source of carbonate and/or bicarbonate ion. As an alternative to thermal decomposition, the decomposition of urea can be achieved at room temperature by an enzyme-catalyzed reaction. Thus, calcium carbonate precipitates are obtained in 5-10 minutes from solutions containing $CaCl_2$ (0.25-0.50 M), urea (0.25-0.75 M), and urease (0.2-0.2 mg/mL) (Sondi and Matijević, *Journal of Colloid and Interface Science* 238, 208 (2001)).

In one embodiment of the present invention, $Mg^{2+}$ ions are added to the solution during co-precipitation of the composite material comprising carbon nanotubes and Me-carbonate. As indicated above, the presence of $Mg^{2+}$ during the precipitation of calcium carbonate modulates the crystal form and morphology. The carbonate so obtained is predominantly $CaCO_3$ in bulk, but locally it may have a composition resembling $CaMg(CO_3)_2$, which is the mineral known as dolomite.

In one embodiment of the present invention, a dispersion of carbon nanotubes is combined with a freshly prepared suspension of precipitated calcium carbonate powder to form a CNT-$CaCO_3$ composite. The CNTs adsorb to the $CaCO_3$ particles as a result of interactions between polar functional groups on the CNTs and the particle surface, as described above. Synthetic precipitated calcium carbonate (PCC) comprising $CaCO_3$ particles of various shapes and sizes are commercially available, such as, for example, spindle-shaped and 1-2 μm long particles from Merck KGaA (product number 102069) or cubic-shaped and 15-40 nm sized particles from NanoMaterials Technology Pte Ltd (NPCC). The ratio between the CNT and $CaCO_3$ components in the composite is readily controlled by the relative amounts of precipitated calcium carbonate and CNTs in the suspension when the composite is prepared.

In one embodiment of the present invention, the composite material comprising carbon nanotubes and Me-carbonate, preferably $CaCO_3$ is exposed to an aqueous solution containing a phosphate salt to produce a composite material comprising carbon nanotubes and hydroxycarbonate apatite (HCA). The conversion of $CaCO_3$ comprising the composite material may be partial or complete; if said conversion occurs partially, then the material so produced is a composite comprising carbon nanotubes and a mixture of $CaCO_3$ and HCA. Hydroxycarbonate apatite, which is also known as carbonated hydroxyapatite, has the ideal formula $Ca_{10}(PO_4)_3(CO_3)_3(OH)_2$. Recently, HCA has received much attention as a bioactive material in implants, since it closely resembles living bone in its chemical composition and structure and shows effective compatibility with respect to supporting cell attachment, proliferation, and differentiation (Kasuga et al., *Biomaterials* 24, 3247 (2003)). When a composite comprised of calcium carbonate (vaterite form) and poly(lactic acid) is soaked in a simulated body fluid (comprising 2.5 mM $Ca^{2+}$, 142 mM $Na^+$, 1.5 mM $Mg^{2+}$, 5.0 mM $K^+$, 149 mM $Cl^-$, 4.2 mM $HCO_3^-$, 1.0 mM $HPO_4^{2-}$, and 0.5 mM $SO_4^{2-}$, 50 mM tris(hydroxymethyl)methylamine, and 45 mM HCl) at pH 7.4 and 37° C. for 3 hours, bonelike HCA forms on the surface of the composite (Kasuga et al., *Biomaterials* 24, 3247 (2003)). Accordingly, such uses and applications are envisaged for the composite material according to the present invention, too, thereby taking advantage of the exceptional mechanical strength and chemical inertness, and possibly electrical and/or thermal conductivity, of the carbon nanotubes within.

In one embodiment of the present invention, the composite material comprising carbon nanotubes and Me-carbonate, preferably $CaCO_3$, is exposed to an aqueous solution containing a phosphate salt to produce a composite material comprising carbon nanotubes and hydroxyapatite. The conversion of $CaCO_3$ comprising the composite material may be partial or complete; if said conversion occurs completely, then the material so produced is a composite comprising carbon nanotubes and a mixture of $CaCO_3$ and hydroxyapatite. Like HCA (hydroxycarbonate apatite), hydroxyapatite is another material of great interest for biomedical applications because of its excellent biocompatibility and bioactivity. Hydroxyapatite, which has the ideal formula $Ca_{10}(PO_4)_6(OH)_2$, results from the complete replacement of carbonate ions in calcium carbonate by phosphate. The conversion to hydroxyapatite of the aragonite polymorph of $CaCO_3$ is achieved, for example, by exposing it to aqueous phosphate solutions under hydrothermal conditions (160-200° C. for 4-7 hours) by a dissolution-recrystallization mechanism (Jinawath et al., *Materials Science and Engineering C* 22, 35 (2002)), and also at room temperature (7-14 days) in a phosphate buffer solution via a surface reaction (Ni and Ratner, *Biomaterials* 24, 4323 (2003)). The conversion to hydroxyapatite of the calcite polymorph of $CaCO_3$ is achieved, for example, by the hydrothermal treatment of calcite crystals in $H_3PO_4$ suspensions at 120-160° C. for 6-30 hours (Yoshimura et al., *Materials Science and Engineering C* 24, 521 (2004)). New biomedical uses and applications are envisaged for the composite material according to the present invention, taking advantage of the exceptional mechanical strength and chemical inertness, and possibly the electrical and/or thermal conductivity, of the carbon nanotubes within.

In one embodiment of the present invention, the composite material comprising carbon nanotubes and Me-carbonate, preferably $CaCO_3$, is exposed to an acid to remove all or part of the $CaCO_3$ component by decomposition according to the equation: $2H^+ + CaCO_3 \rightarrow Ca^{2+} + CO_2 + H_2O$. The composite material may be present as a suspension or as a solid, such as on a substrate, and the acid may be present as a solution or vapor or aerosol. If the calcium salt that is produced by the acid decomposition reaction is soluble, it may be removed by washing, with, for example, water or methanol. Removal of the $CaCO_3$ component may leave a flexible fabric-like shell of interwoven CNTs whose shape resembles that of the composite material itself, such as a rhombohedron, but the shell tends to collapse upon drying. If the evolution of $CO_2$ during the acid decomposition reaction is rapid enough, the shell of interwoven CNTs may burst open. Rupture of the shell can be avoided by using buffered acidic solutions having pH of 2.

In one embodiment of the present invention, all or part of the $CaCO_3$ component is removed from the composite material comprising carbon nanotubes and Me-carbonate, preferably $CaCO_3$ by exposing it to an aqueous solution of a chelating agent for $Ca^{2+}$, such as ethylenediaminetetraacetic acid (EDTA) or lactic acid. The $CaCO_3$ core of porous microparticles coated with polyelectrolytes dissolve when treated with aqueous solutions of EDTA (disodium salt) at pH 7-7.5 (Volodkin et al., *Langmuir* 20, 3398 (2004), *Biomacromolecules* 5, 1962 (2004)). Using this method of removing the $CaCO_3$ component from CNT-$CaCO_3$ composite material can avoid rapid $CO_2$ evolution so that the shell of interwoven CNTs does not burst open.

In one embodiment of the present invention, the composite material comprising carbon nanotubes and Me-carbonate, preferably $CaCO_3$, is deposited onto a substrate before the $CaCO_3$ component is chemically transformed. When the composite particles are deposited from an aqueous suspension or slurry, adhesion between the substrate surface and the composite particles can be strong enough to cause the particles to be immobilized upon drying, as indicated in some examples below. In one embodiment, the suspension or slurry of the composite material is manipulated and deposited onto the substrate using capillary forces with, for example, a glass capillary tube or the tip of a drawing pen.

In one embodiment of the present invention, the particles within the composite material comprising carbon nanotubes and $CaCO_3$ are broken into smaller fragments prior to deposition onto a substrate.

In one embodiment of the present invention, the dry composite particles, as in a powder, are manipulated or positioned on the substrate individually or in small clusters by using, for example, a stiff nylon filament. The advantage of positioning CNTs onto substrates in the form of single particle composites rather than in the form of a solution is apparent from the volume involved. An approximately cubic shaped particle with 10-μm sides has a volume of approximately $10^{-3}$ μL. Solutions with such small volumes, which are essentially aerosol droplets, are very difficult to transfer and place accurately on a substrate. Alternatively, an external electric field is used to position or manipulate the particles in a suspension or slurry by electrokinetic phenomena such as electrophoresis or dielectrophoresis. For example, Suzuki et al. (*Langmuir* 20, 11005 (2004)) fabricated two-dimensional line and grid patterns of microparticles on glass substrates using the repulsive force of negative dielectrophoresis. While aqueous solvents can be used during dielectrophoresis, a non-aqueous solvent, such as ethanol, may be preferred instead if the suspension or slurry of particles to be positioned or manipulated using electrophoretic forces.

In one embodiment of the present invention, the composite material comprising carbon nanotubes and Me-carbonate, preferably, $CaCO_3$, is coated with another material. Composite particles comprising a calcite ($CaCO_3$) core and silica ($SiO_2$) shell can be prepared by adding a solution of $Na_2SiO_3$ to a slurry of $CaCO_3$ particles, and heating the mixture to 80° C. while neutralizing it to pH 7 with gaseous $CO_2$ (Zhang and Li, *Powder Technology* 141, 75 (2004)). The resulting thickness of the silica shell depends on the size of the $CaCO_3$ particles and the $Na_2SiO_3/CaCO_3$ molar ratio. The shell is porous enough to allow the $CaCO_3$ core to be removed by acidification of the core/shell composite particles with HCl (Zhang and Li, *Powder Technology* 141, 75 (2004)). Alternatively, the source of silica for the shell is an organic ester of silicon such as tetraethoxysilane (also known as tetraethyl orthosilicate). The hydrolysis of tetraethoxysilane in ethanol-water-ammonia mixtures, known as the Stöber process, has been used to coat a wide variety of particles with silica shells (Hardikar and Matijević, *Journal of Colloid and Interface Science* 221, 133 (2000)), and the Stöber process can be further modified to include silane coupling agents and amines other than ammonia as catalysts (Kobayashi et al., *Colloids and Surfaces A* 251, 197 (2004)). A third way that the silica shell may be grown on the composite material comprising carbon nanotubes and $CaCO_3$ is by exposing the composite material to vapors of tetramethoxysilane or tetraethoxysilane at a temperature of 100-200° C. (Tanaka et al., *Langmuir* 20, 3780 (2004)).

In one embodiment of the present invention, the composite material comprising carbon nanotubes and Me-carbonate, preferably $CaCO_3$, is deposited onto a substrate and then treated to lift the nanotubes so that they protrude vertically from the surface of the substrate. Several kinds of surface treatments that lift nanotubes, often referred to as "activation", are known in the prior art for improving the field emission characteristics from printed CNTs. Various techniques for activation include rubbing and peel-off with vinyl tape (Kim et al., *Journal of Vacuum Science and Technology B* 22, 1331), multiple field emission cycles (Kim et al., *Applied Physics Letters* 84, 5350 (2004)), argon ion irradiation (Kim et al., *Carbon* 42, 1807 (2004)), UV laser irradiation (Zhou et al., *Japanese Journal of Applied Physics, Part 1* 41, 4314 (2002)), and the use of adhesive tape (Vink et al., *Applied Physics Letters* 83, 3552 (2003)).

In one embodiment of the present invention, the composite material comprising carbon nanotubes and Me-carbonate, preferably $CaCO_3$, is deposited onto a substrate and bonded to a pressure sensitive adhesive tape by means of the adhesive layer, and then the adhesive tape is peeled away to lift the nanotubes so that they protrude vertically from the surface of the substrate. Preferably, the pressure sensitive adhesive tape has been engineered to leave little or no residues upon removal, such as a dicing tape for semiconductor wafer dicing. More preferably, the pressure sensitive adhesive tape has a curable adhesive layer, which is cured before the tape is peeled away. The adhesive is cured in the sense that it looses its adhesive properties ("tackiness") when exposed to an external perturbation such as heat or light, such as a UV-curable dicing tape, which is commercially available from, for example, Lintec Corporation (Tokyo, Japan) and Semiconductor Equipment Corporation (Moorpark, Calif.).

In one embodiment of the present invention, the composite material comprising carbon nanotubes and Me-carbonate, preferably $CaCO_3$, deposited onto a substrate is first treated to remove the $CaCO_3$ component partially or completely before being treated to lift the nanotubes so that they protrude from the surface of the substrate.

In one embodiment of the present invention, the composite material comprising carbon nanotubes and Me-carbonate, preferably $CaCO_3$ is deposited onto a rigid electrically conductive substrate, such as silicon or porous silicon, preferably n- or p-type doped silicon, a metal film, such as aluminum- or gold-coated glass or silicon, or a conductive metal oxide film, such as indium tin oxide (ITO), fluorine-doped tin oxide (FTO), or gallium- or aluminum-doped zinc oxide, on glass or silicon.

In one embodiment of the present invention, the composite material comprising carbon nanotubes and Me-carbonate, preferably $CaCO_3$, is deposited onto a flexible electrically conductive substrate, such as a metal film, such as aluminum- or gold-coated polyester or polyimide, or a conductive metal oxide film, such as indium tin oxide (ITO), fluorine-doped tin oxide (FTO), or gallium- or aluminum-doped zinc oxide, on a polymer such as polyester or polyimide.

In one embodiment of the present invention, the composite material comprising carbon nanotubes and Me-carbonate, preferably $CaCO_3$, is deposited onto an electrically conductive substrate, preferably n- or p-doped silicon, with an insulating layer on its surface, preferably silicon dioxide.

In one embodiment of the present invention, the composite material comprising carbon nanotubes and Me-carbonate, preferably $CaCO_3$, is deposited onto and/or between electrodes on a rigid or flexible substrate to produce a network of carbon nanotubes in electrical contact with the electrodes.

In one embodiment of the present invention, the composite material comprising carbon nanotubes and Me-carbonate, preferably $CaCO_3$, is deposited onto and/or between electrodes on a rigid or flexible substrate so that the carbon nanotubes are in electrical contact with the electrodes. As is indicated schematically in FIG. 3, the carbon nanotubes within the composite material may provide an electrically conductive channel in field effect transistor devices that can either be back-gated (FIG. 3A) or gated through an ion-conducting electrolyte (FIG. 3B).

In one embodiment of the present invention, the composite material comprising carbon nanotubes and Me-carbonate, preferably $CaCO_3$, is deposited onto a rigid or flexible transparent electrically insulating substrate such as glass or plastic or onto a semiconductor such as GaN and thereafter the Me-carbonate component is removed by, e.g., exposing the composite material to an acid or chelating agent for the Me ion to produce an electrically conductive film comprising a network of carbon nanotubes, preferably a transparent electrically conductive film.

Reference is now made to the figures, wherein the abbreviation TEM refers to transmission electron microscopy and the abbreviation SEM refers to scanning electron microscopy:

FIG. 1 illustrates potential mechanisms by which the carbon nanotubes interact with calcium carbonate ($CaCO_3$) in a composite according to the present invention (not drawn to scale). The $CaCO_3$ component may be in any of its solid-state phases (amorphous, vaterite, aragonite, calcite), or a mixture thereof. Without wishing to be bound by any theory, FIG. 1A illustrates hydrogen bonding between a carbonate ion on the surface of the calcium carbonate component and a terminal amide group of a urea-melt modified carbon nanotube (sidewall modification).

Figure 1:
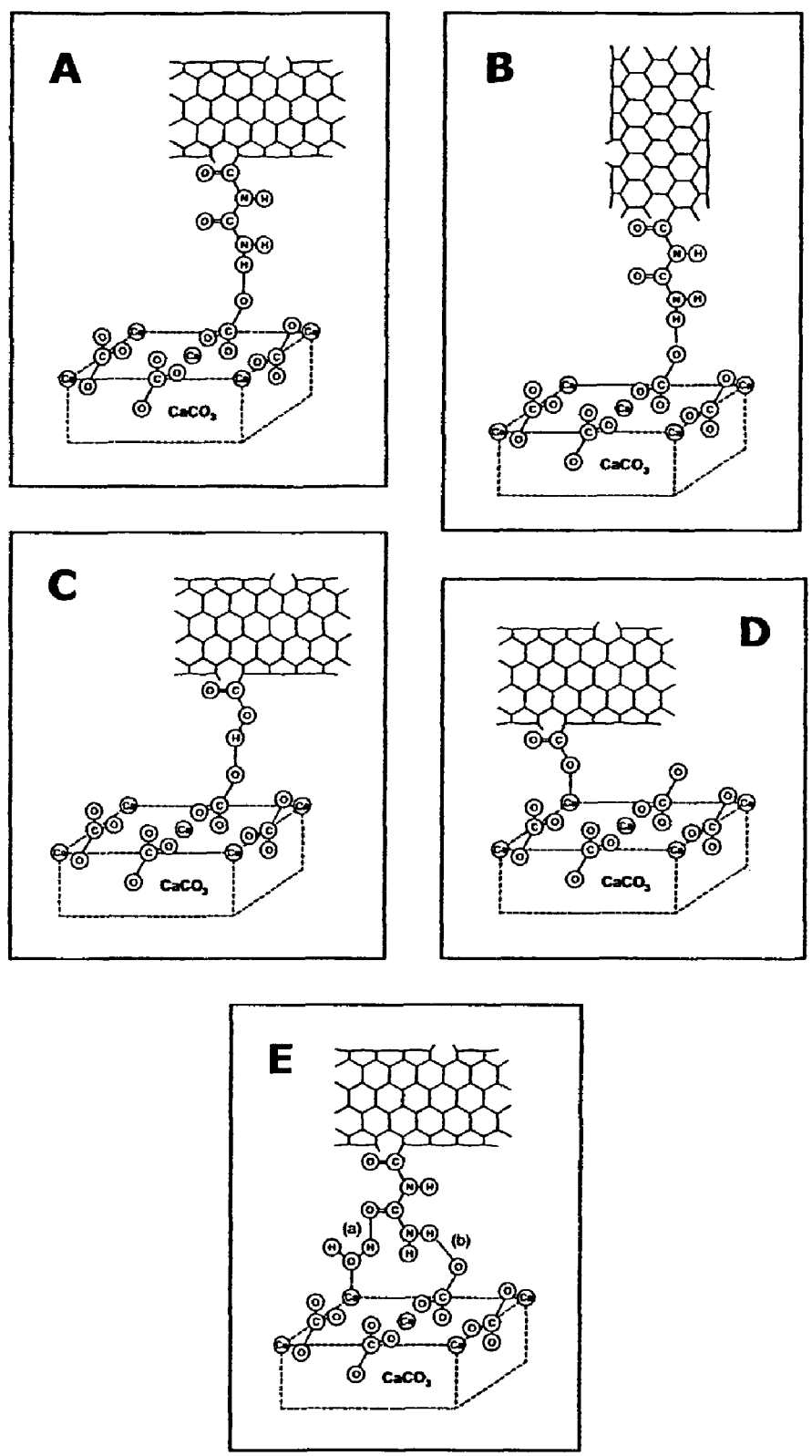
FIG. 1B illustrates hydrogen bonding between a carbonate ion on the surface of the calcium carbonate component and a terminal amide group of a urea-melt modified carbon nanotube (end modification).
FIG. 1C illustrates hydrogen bonding between a carbonate ion on the surface of the calcium carbonate and a carboxylic acid group of an acid-purified carbon nanotube (sidewall modification). Analogous structures can be drawn for carboxylic acid groups located at the ends of nanotubes.
FIG. 1D illustrates coordinative bonding between a calcium ion on the surface of the calcium carbonate component and a carboxylate group of an acid-purified carbon nanotube (sidewall modification). Analogous structures can be drawn for carboxylate groups located at the ends of nanotubes.
FIG. 1E illustrates hydrogen bonding between the surface of the calcium carbonate component and a urea-melt modified carbon nanotube (sidewall modification). The two interactions indicated are between (a) a hydrated calcium ion and a carbonyl group and (b) a carbonate ion and a terminal amide group.
Figure 2:
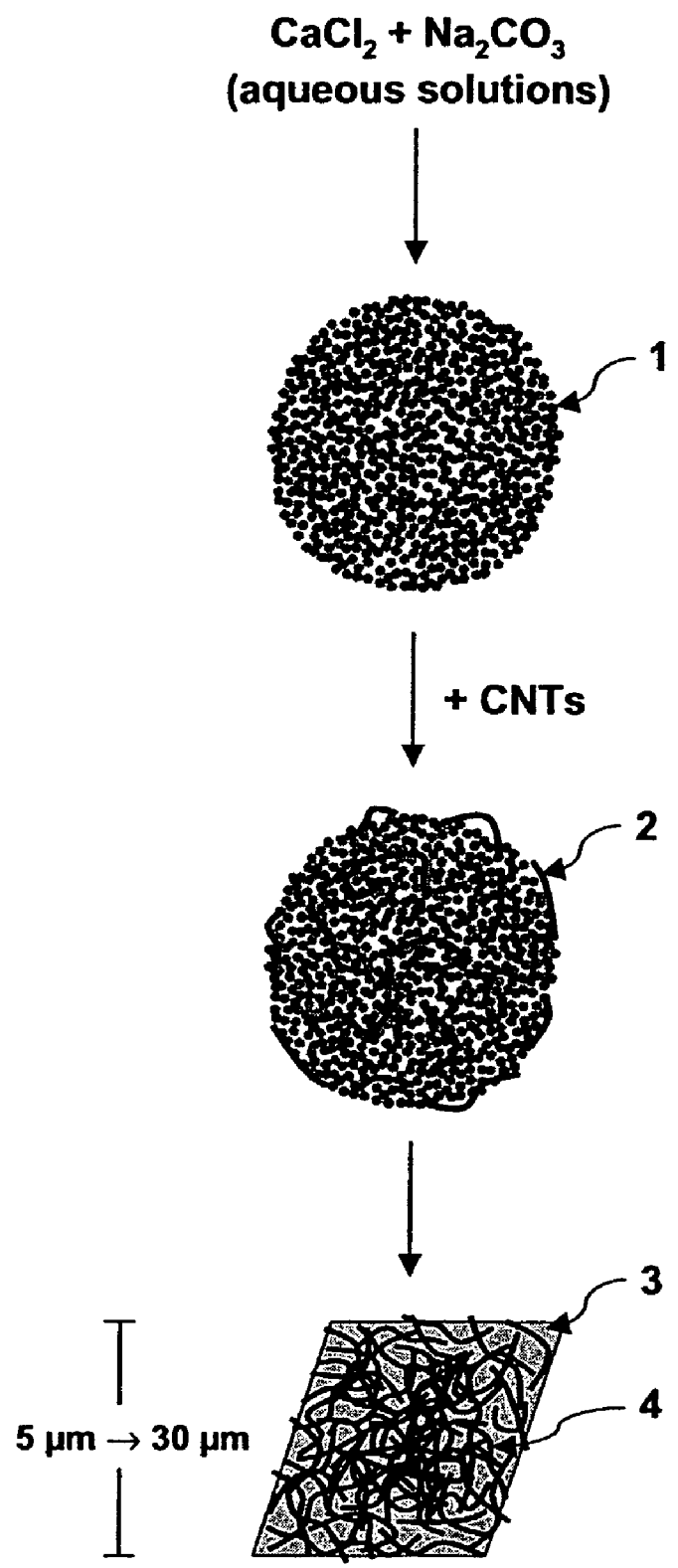

FIG. 2 is a schematic representation of steps in the preparation of crystalline CNT-$CaCO_3$ composite material via transformation of amorphous CNT-$CaCO_3$ composite material, according to Example 5 (not drawn to scale). 1: porous microparticle comprising amorphous $CaCO_3$, 2: CNT adsorbed to porous microparticle comprising amorphous $CaCO_3$, 3: microparticle comprising crystalline $CaCO_3$, 4: CNT embedded within microparticle comprising crystalline $CaCO_3$.

Figure 3:
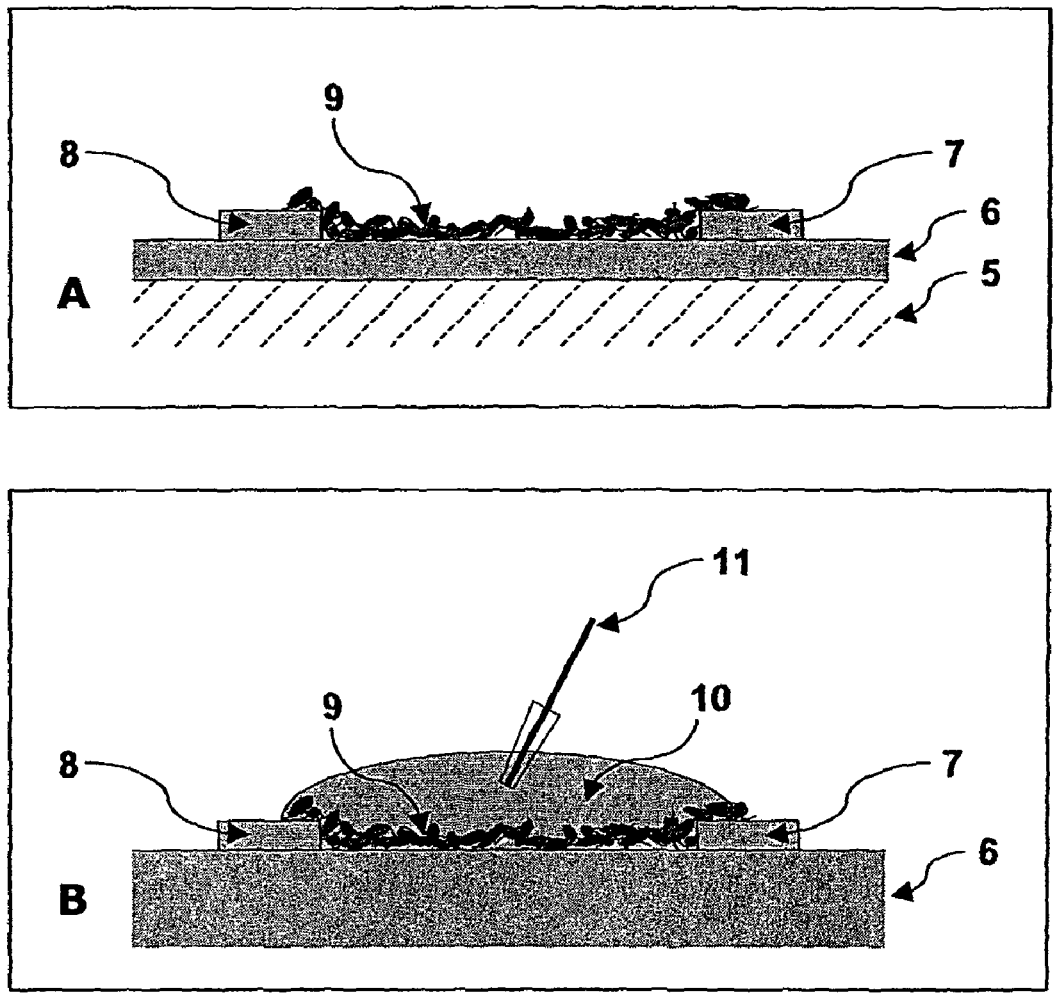

FIG. 3: Schematic cross-sectional representations of field effect transistor devices wherein films of the CNT-$CaCO_3$ composite materials described in the present invention serve as channels (not drawn to scale). 5: conductor (bulk substrate; gate electrode), 6: non-conductor (film or substrate), 7: conductor (source electrode), 8: conductor (drain electrode), 9: CNT-$CaCO_3$ composite (channel), 10: ion-conductor (electrolyte), 11: conductor (gate electrode).

Figure 4:
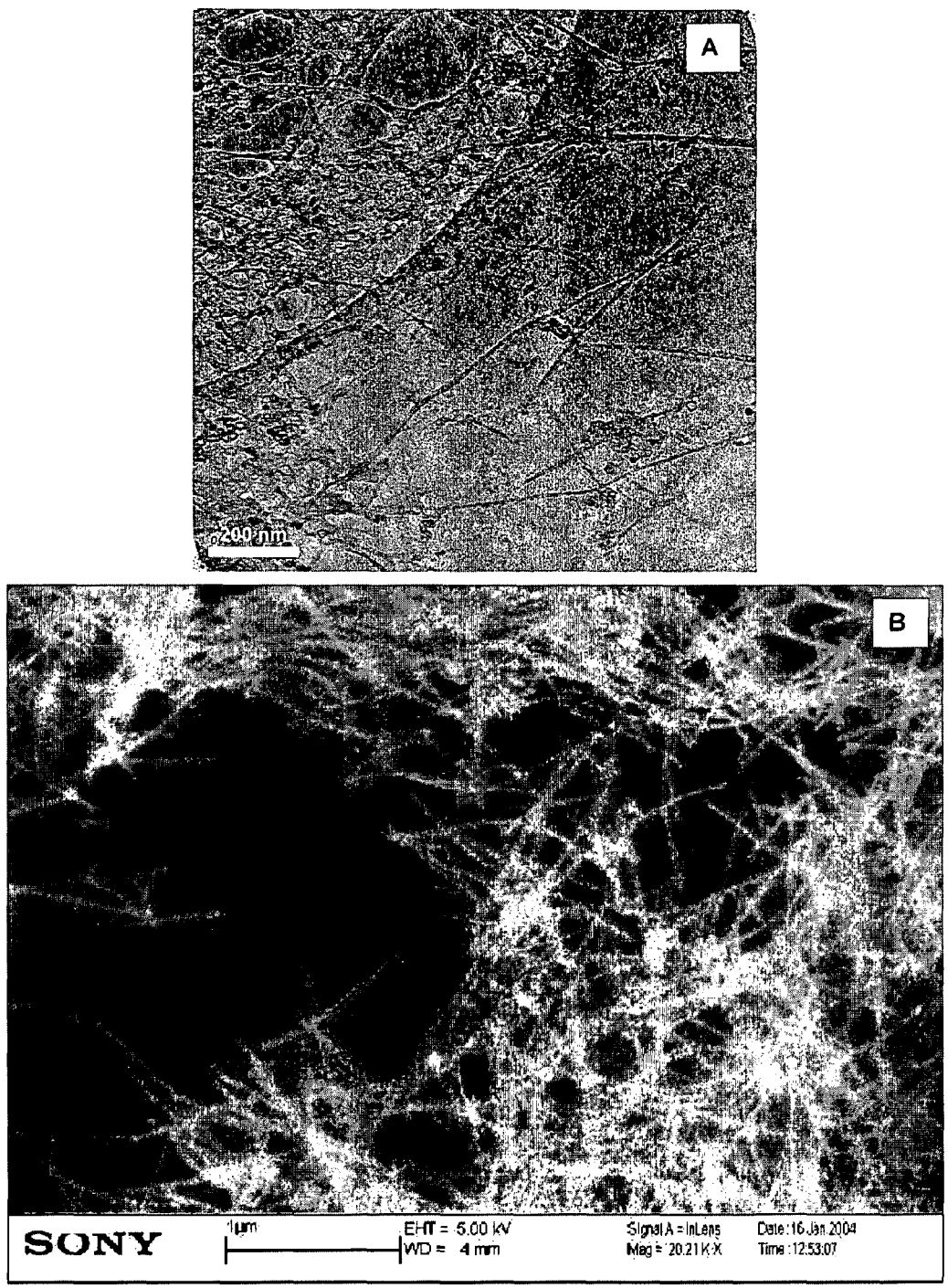

FIG. 4A is a TEM image of bundles of the water-soluble U-SWNTs prepared according to Example 1. Magnification: 15000×.

FIG. 4B is an SEM image of bundles of the water-soluble UA-SWNTs prepared according to Example 2. Magnification: 20200×.

Figure 5:
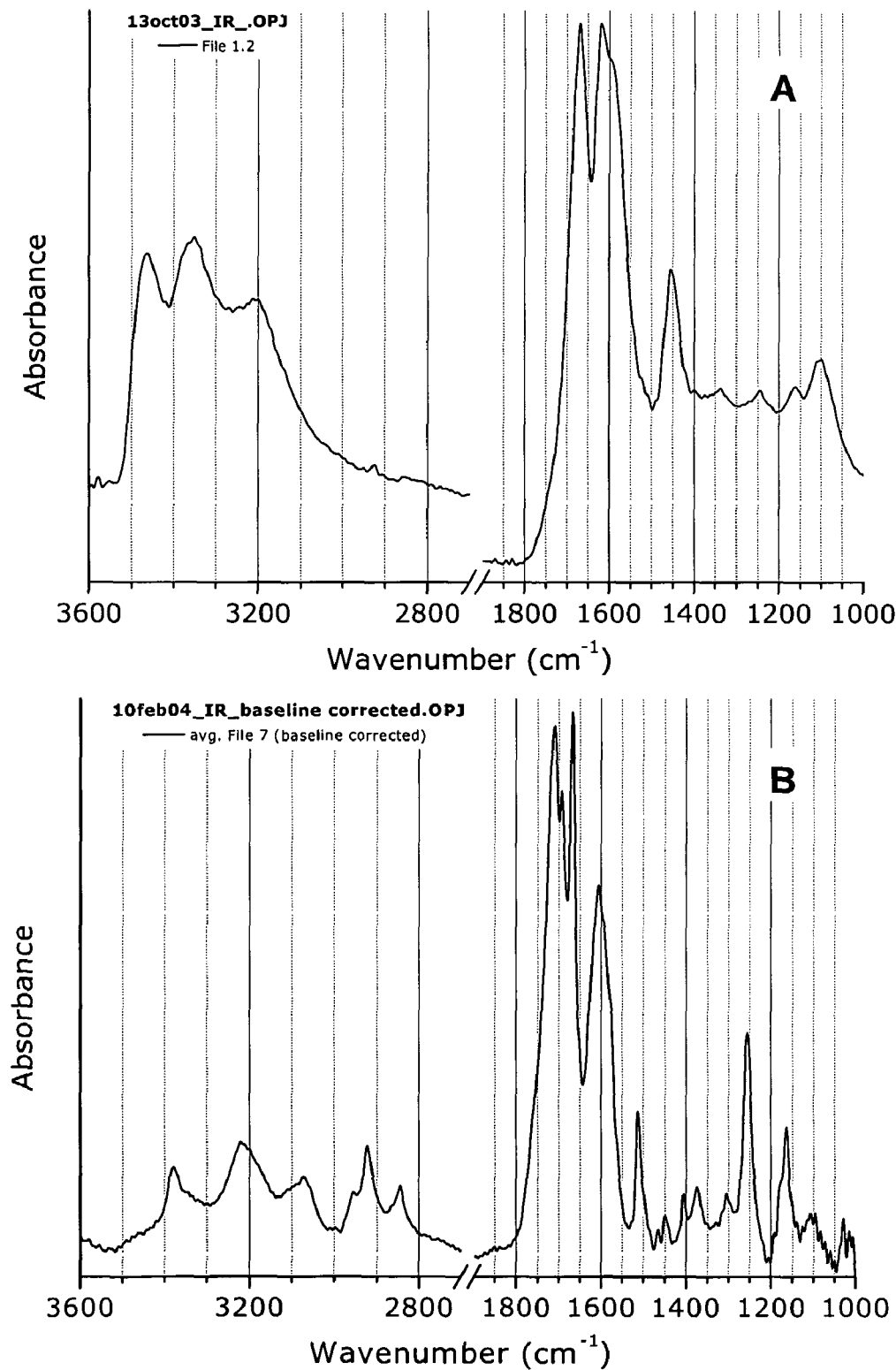

FIG. 5A is an infrared absorption spectrum of the water-soluble U-SWNTs prepared according to Example 1. The sample comprises a dry film of the material on $CaF_2$.

FIG. 5B is an infrared absorption spectrum of the water-soluble UA-SWNTs prepared according to Example 2. The sample comprises a dry film of the material on $CaF_2$.

Figure 6:
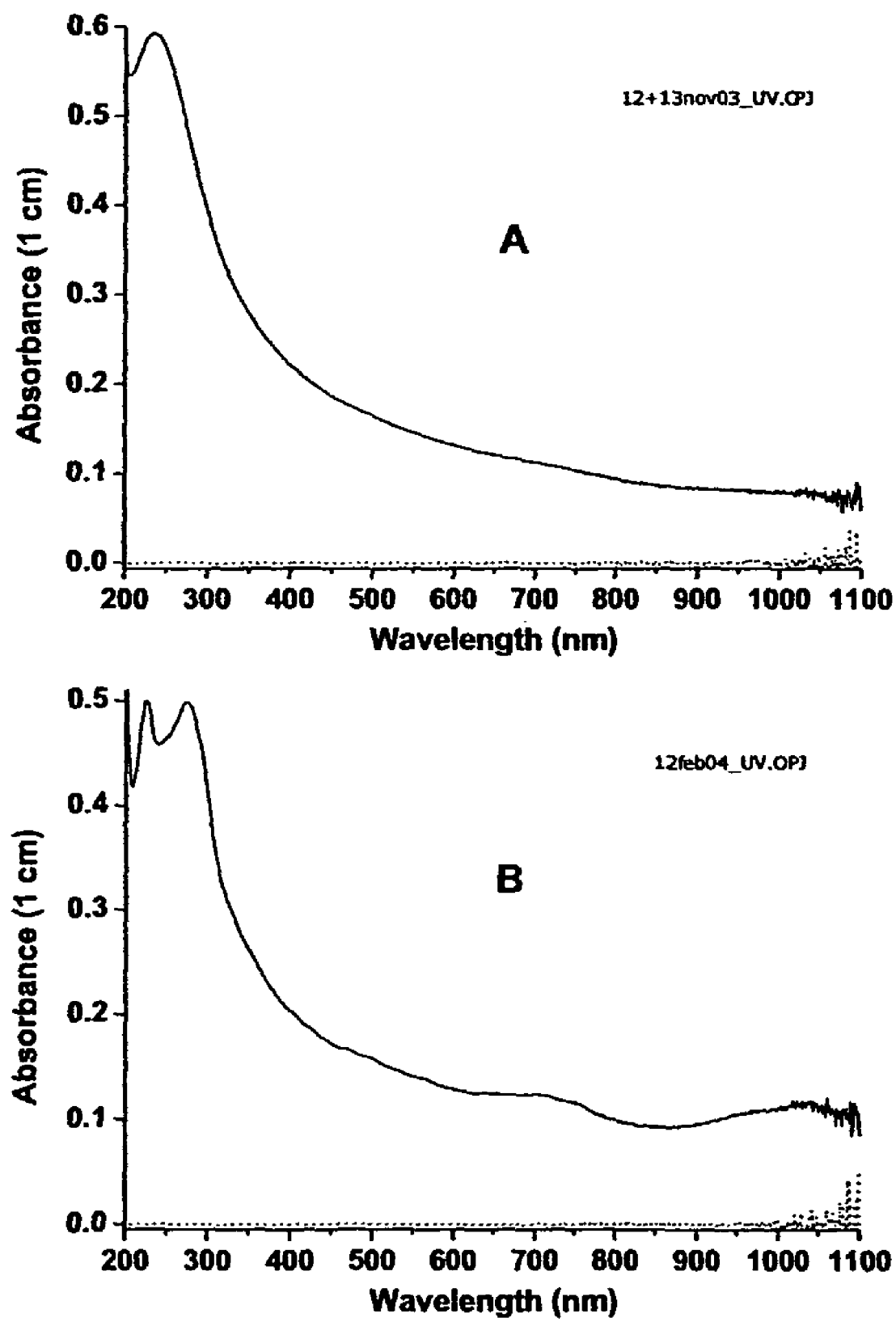

FIG. 6A is an ultraviolet-visible absorption spectrum of an aqueous solution of the water-soluble U-SWNTs prepared according to Example 1. Based on the absorbance at 800 nm, the approximate concentration of SWNTs in this solution is 5 mg/L.

FIG. 6B is an ultraviolet-visible absorption spectrum of an aqueous solution of the water-soluble UA-SWNTs prepared according to Example 2. Based on the absorbance at 800 nm, the approximate concentration of SWNTs in this solution is 4 mg/L.

FIG. 7A is an SEM image of the U-SWNT-$CaCO_3$ composite material prepared by diffusion of $(NH_4)_2CO_3$ vapor into $CaCl_2$ solution and deposited onto a silicon substrate according to Example 4. Magnification: 70×.

FIG. 7B is an SEM image of the UA-SWNT-$CaCO_3$ composite material prepared by diffusion of $(NH_4)_2CO_3$ vapor into $CaCl_2$ solution and deposited onto a silicon substrate according to Example 4. Magnification: 200×.

Figure 8:
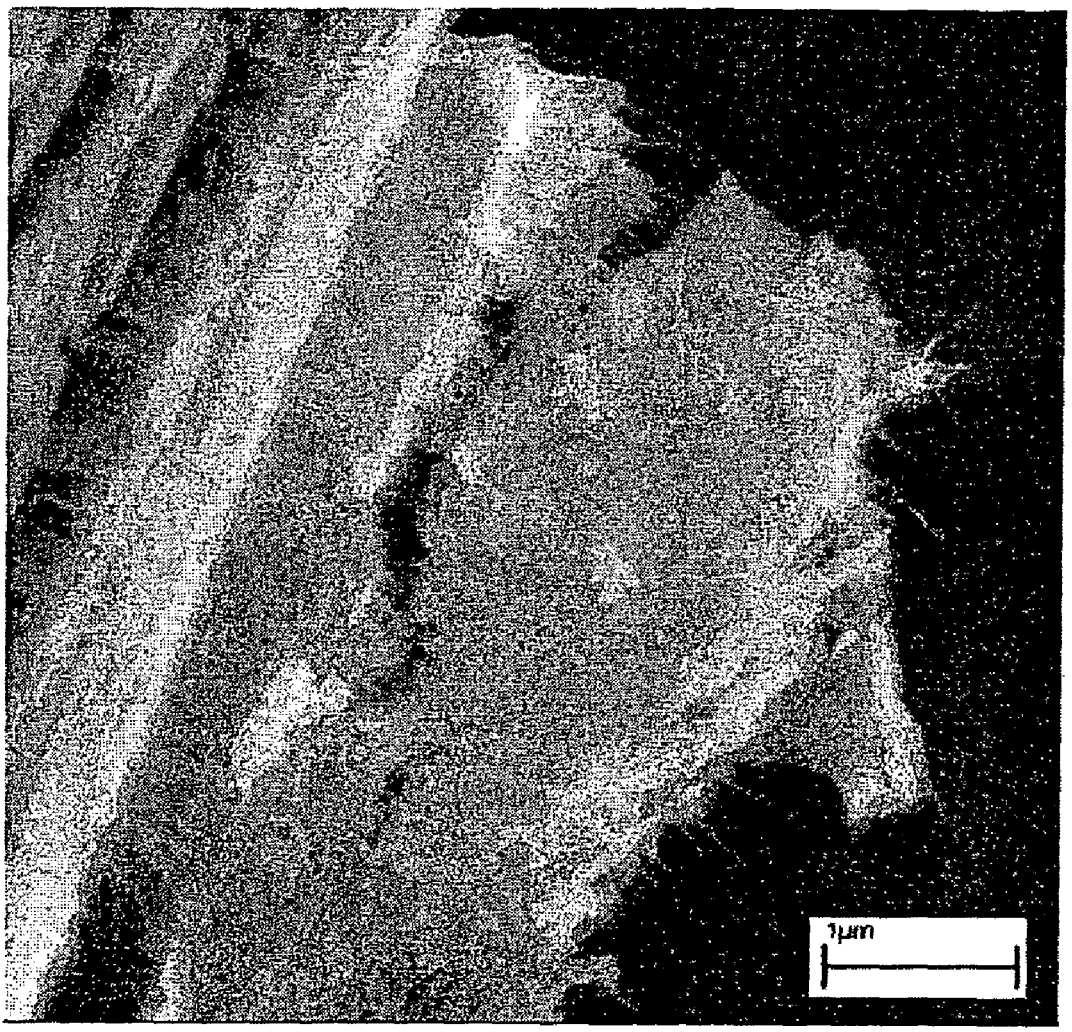

FIG. 8 is an SEM image of mechanically crushed U-SWNT-$CaCO_3$ composite material. The dry crystalline composite particle, which was prepared according to Example 4, was mechanically crushed between the silicon substrate and the tip of forceps.

Figure 9:
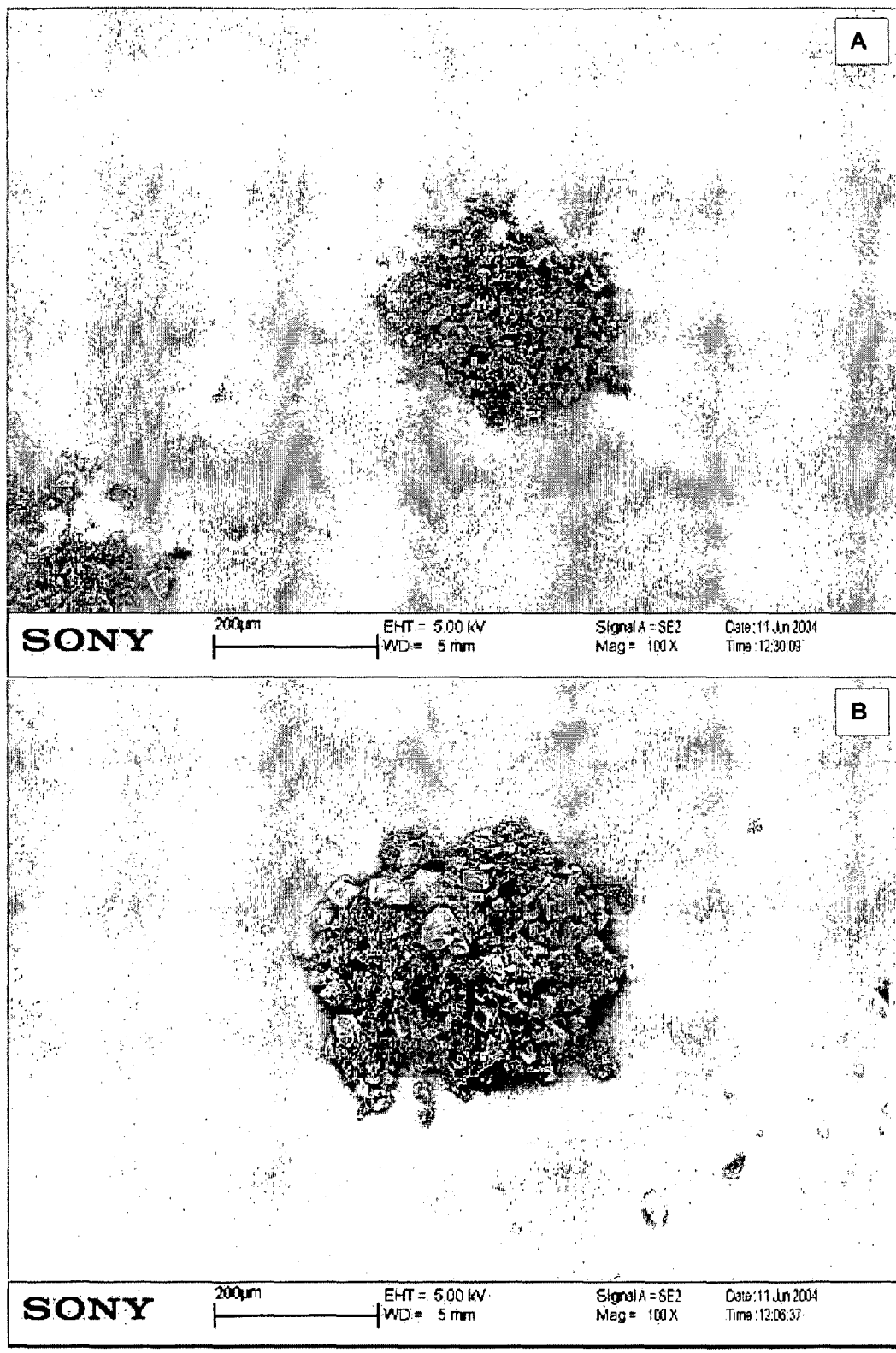

FIG. 9A is an SEM image of U-SWNT-$CaCO_3$ composite material that was crushed mechanically before being deposited onto a silicon substrate according to Example 4. Magnification: 100×.

FIG. 9B is an SEM image of UA-SWNT-$CaCO_3$ composite material that was crushed mechanically before being deposited onto a silicon substrate according to Example 4. Magnification: 100×.

Figure 10:

FIG. 10A is an SEM image of the U-SWNT-$CaCO_3$ composite material prepared by adding $Na_2CO_3$ solution to $CaCl_2$ solution and deposited onto an FTO substrate according to Example 5. Magnification: 3000×.

FIG. 10B is an SEM image of the U-SWNT-$CaCO_3$ composite material prepared by adding $CaCl_2$ solution to $Na_2CO_3$ solution and deposited onto an FTO substrate according to Example 5. Magnification: 1000×.

Figure 11:
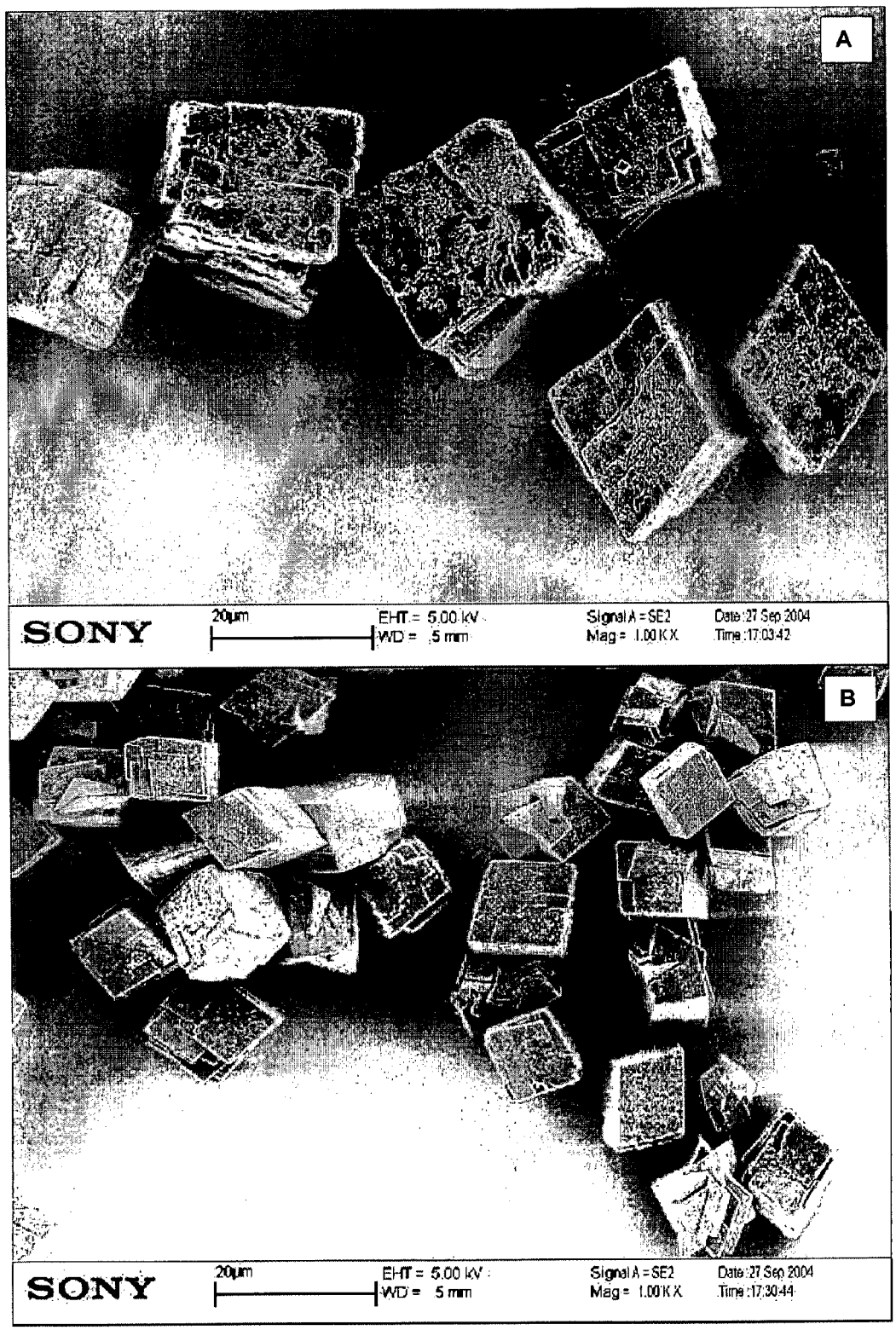

FIG. 11A is an SEM image of the UA-SWNT-$CaCO_3$ composite material prepared by adding $Na_2CO_3$ solution to $CaCl_2$ solution and deposited onto an FTO substrate according to Example 5. Magnification: 1000×.

FIG. 11B is an SEM image of the UA-SWNT-$CaCO_3$ composite material prepared by adding $CaCl_2$ solution to $Na_2CO_3$ solution and deposited onto an FTO substrate according to Example 5. Magnification: 1000×.

Figure 12:
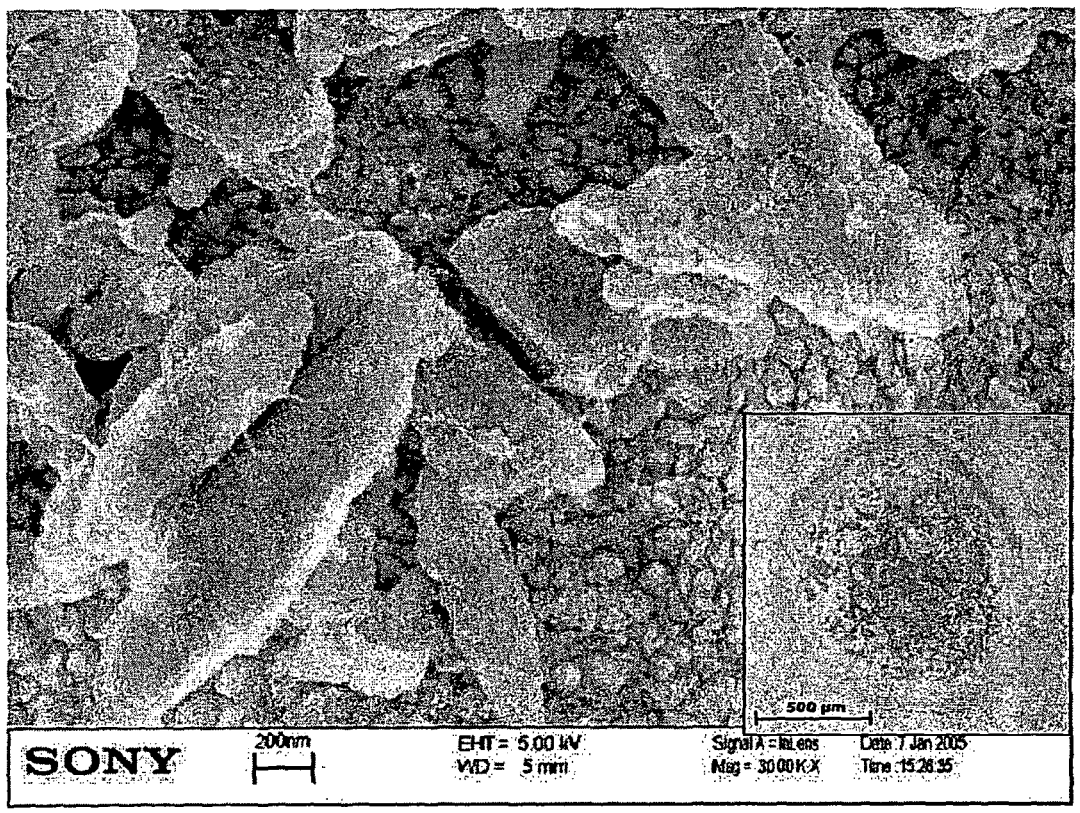

FIG. 12 is an SEM image of the U-SWNT-$CaCO_3$ composite material obtained by adsorption onto precipitated calcium carbonate powder from Merck and deposited onto an FTO-glass substrate according to Example 6. Magnification: 30000× and 50× (inset).

Figure 13:
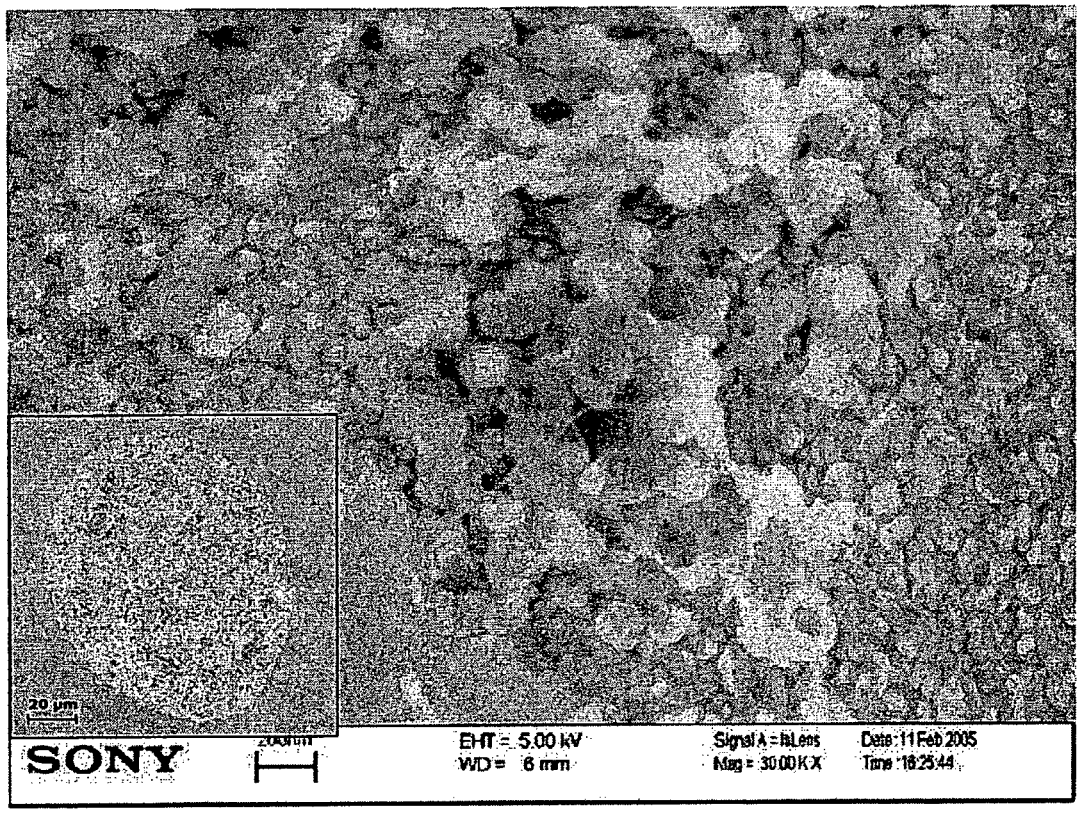

FIG. 13 is an SEM image of the U-SWNT-$CaCO_3$ composite material obtained by adsorption onto precipitated calcium carbonate powder from NanoMaterials Technology and deposited onto an FTO-glass substrate according to Example 6. Magnification: 30000× and 500× (inset).

Figure 14:
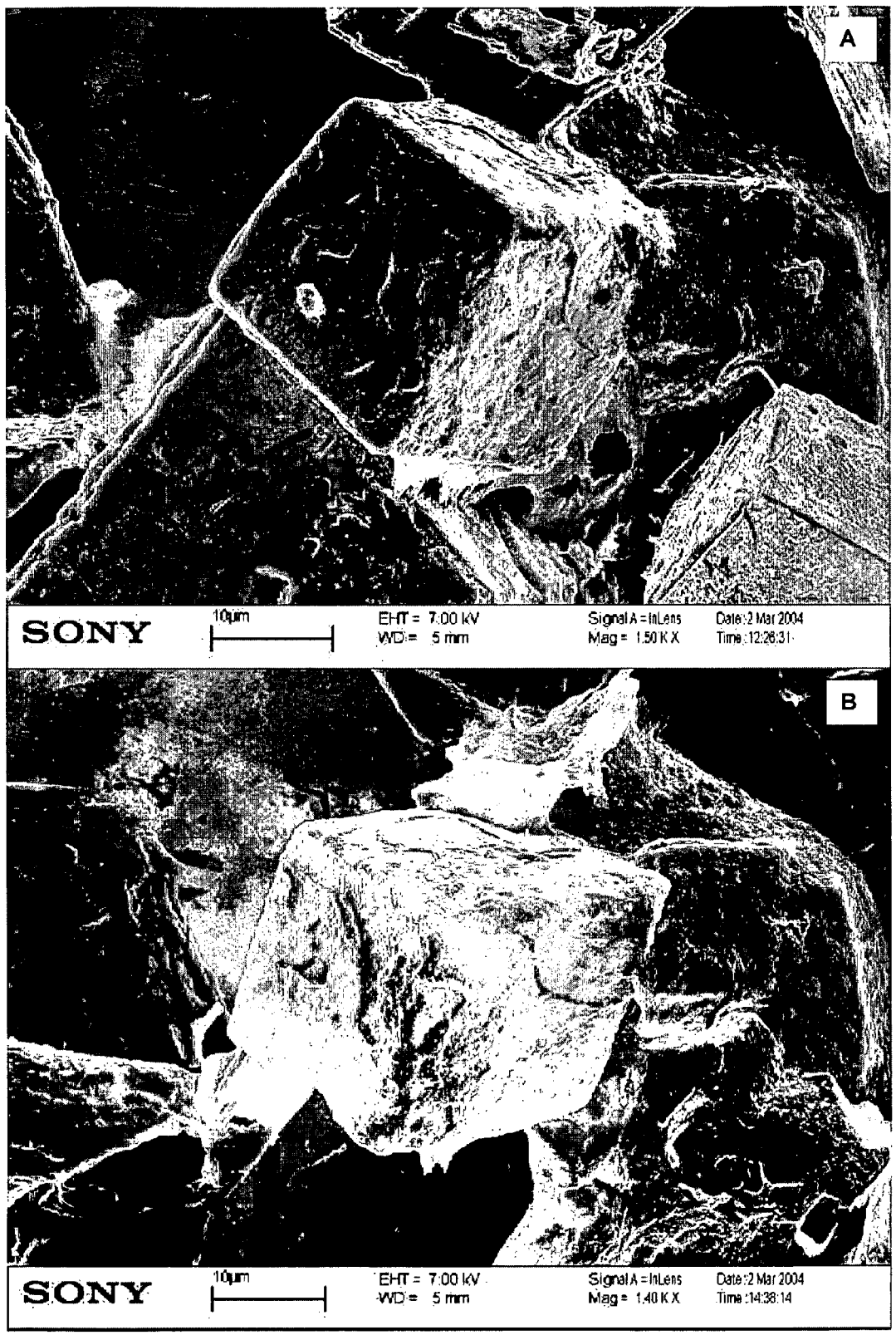

FIG. 14A is an SEM image the U-SWNT-$CaCO_3$ composite material prepared by diffusion of $(NH_4)_2CO_3$ vapor into $CaCl_2$ solution and deposited onto a gold substrate according to Example 4. Magnification: 1500×.

FIG. 14B is an SEM image of the sample shown in FIG. 12A following treatment with 1 M HCl solution to dissolve the $CaCO_3$ component according to Example 7. Magnification: 1400×. The field of view in this image is approximately the same as the one in FIG. 14A.

Figure 15:
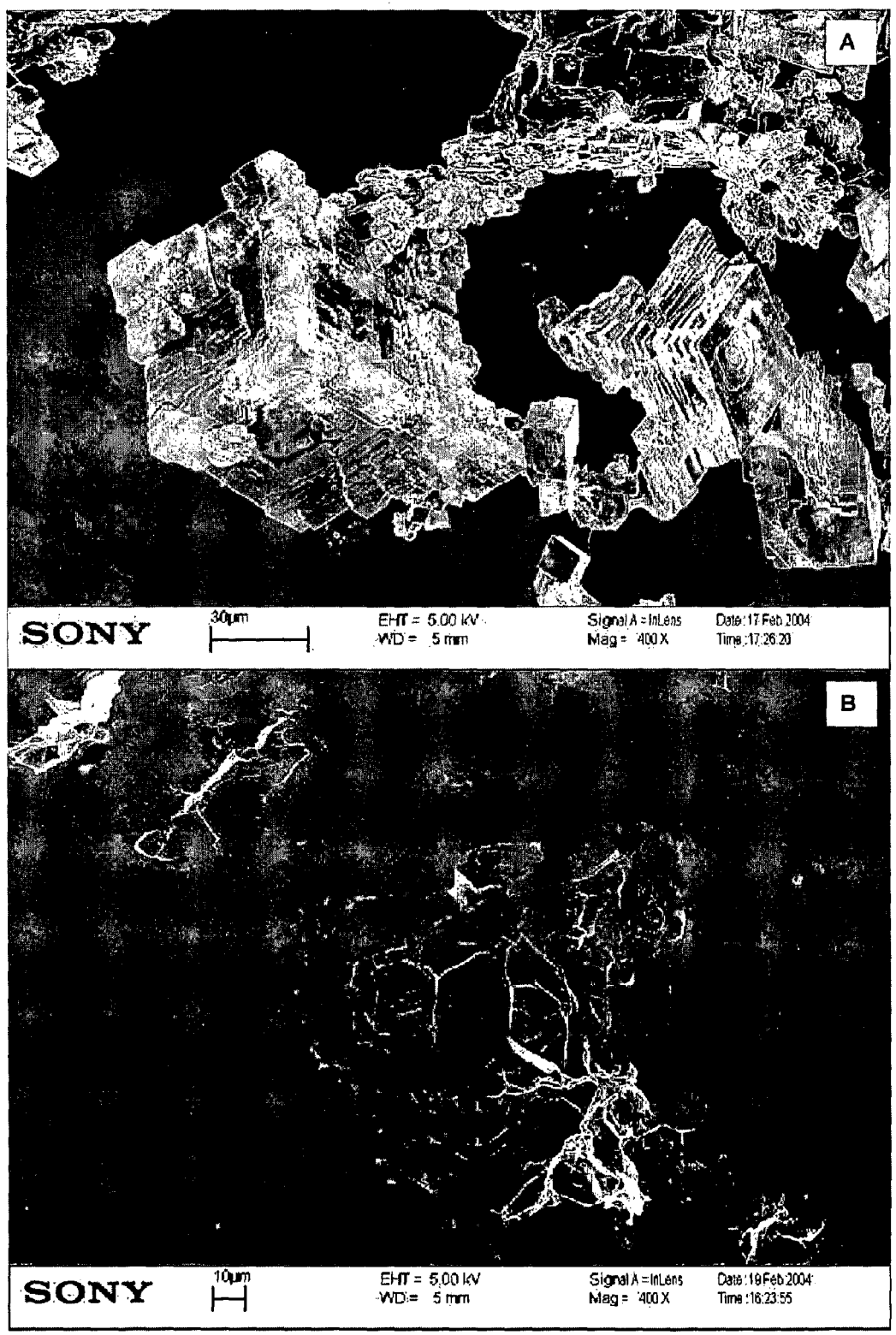

FIG. 15A is an SEM image the UA-SWNT-$CaCO_3$ composite material prepared by diffusion of $(NH_4)_2CO_3$ vapor into $CaCl_2$ solution and deposited onto a silicon substrate according to Example 4. Magnification: 400×.

FIG. 15B is an SEM image of the sample shown in FIG. 14A following treatment with 0.25 M $H_2SO_4$ solution to dissolve the $CaCO_3$ component according to Example 7. Magnification: 400×. The field of view in this image is approximately the same as the one in FIG. 15A.

Figure 16:

FIG. 16A is an SEM image of the UA-SWNT-$CaCO_3$ composite material prepared by diffusion of $(NH_4)_2CO_3$ vapor into $CaCl_2$ solution and deposited onto a silicon substrate according to Example 4, followed by treatment with 0.25 M $H_2SO_4$ solution to dissolve the $CaCO_3$ component according to Example 7. Magnification: 3000×.

FIG. 16B is an SEM image of the same sample as FIG. 16A obtained with higher magnification. Magnification: 10000×.

FIG. 17A is an SEM image of the U-SWNT-$CaCO_3$ composite material prepared by adding $CaCl_2$ solution to $Na_2CO_3$ solution and deposited onto an FTO substrate according to Example 5, followed by treatment with 1 M HCl solution to dissolve the $CaCO_3$ component according to Example 8. Magnification: 100×.

FIG. 17B is an SEM image of the same sample as FIG. 17A obtained with higher magnification. Magnification: 1000×.

FIG. 18A is an SEM image of the UA-SWNT-$CaCO_3$ composite material prepared by adding $CaCl_2$ solution to $Na_2CO_3$ solution and deposited onto an FTO substrate according to Example 5, followed by treatment with 1 M HCl solution to dissolve the $CaCO_3$ component according to Example 8. Magnification: 1000×.

FIG. 18B is an SEM image of the same sample as FIG. 18A obtained with higher magnification. Magnification: 9000×.

FIG. 19A is an SEM image the UA-SWNT-$CaCO_3$ composite material prepared by adding $CaCl_2$ solution to $Na_2CO_3$ solution and deposited onto an FTO substrate according to Example 5, followed by treatment with 1 M HCl solution to partially dissolve the $CaCO_3$ component according to Example 8. Magnification: 1000×.

FIG. 19B is an SEM image of the same sample as FIG. 19A obtained with higher magnification. Magnification: 2500×.

Figure 20:

FIG. 20A is an SEM image of the U-SWNT-$CaCO_3$ composite material prepared by diffusion of $(NH_4)_2CO_3$ vapor into $CaCl_2$ solution and deposited onto a silicon substrate according to Example 4, followed by treatment with 0.25 M $H_2SO_4$ solution to dissolve the $CaCO_3$ component according to Example 7, followed by treatment with Scotch Magic 810 adhesive tape to lift the SWNTs according to Example 10. Magnification: 13000×.

FIG. 20B is an SEM image of the UA-SWNT-$CaCO_3$ composite material prepared by diffusion of $(NH_4)_2CO_3$ vapor into $CaCl_2$ solution and deposited onto a silicon substrate according to Example 4, followed by treatment with 0.25 M $H_2SO_4$ solution to dissolve the $CaCO_3$ component according to Example 7, followed by treatment with Scotch Magic 810 adhesive tape to lift the SWNTs according to Example 10. Magnification: 15000×.

Figure 21:
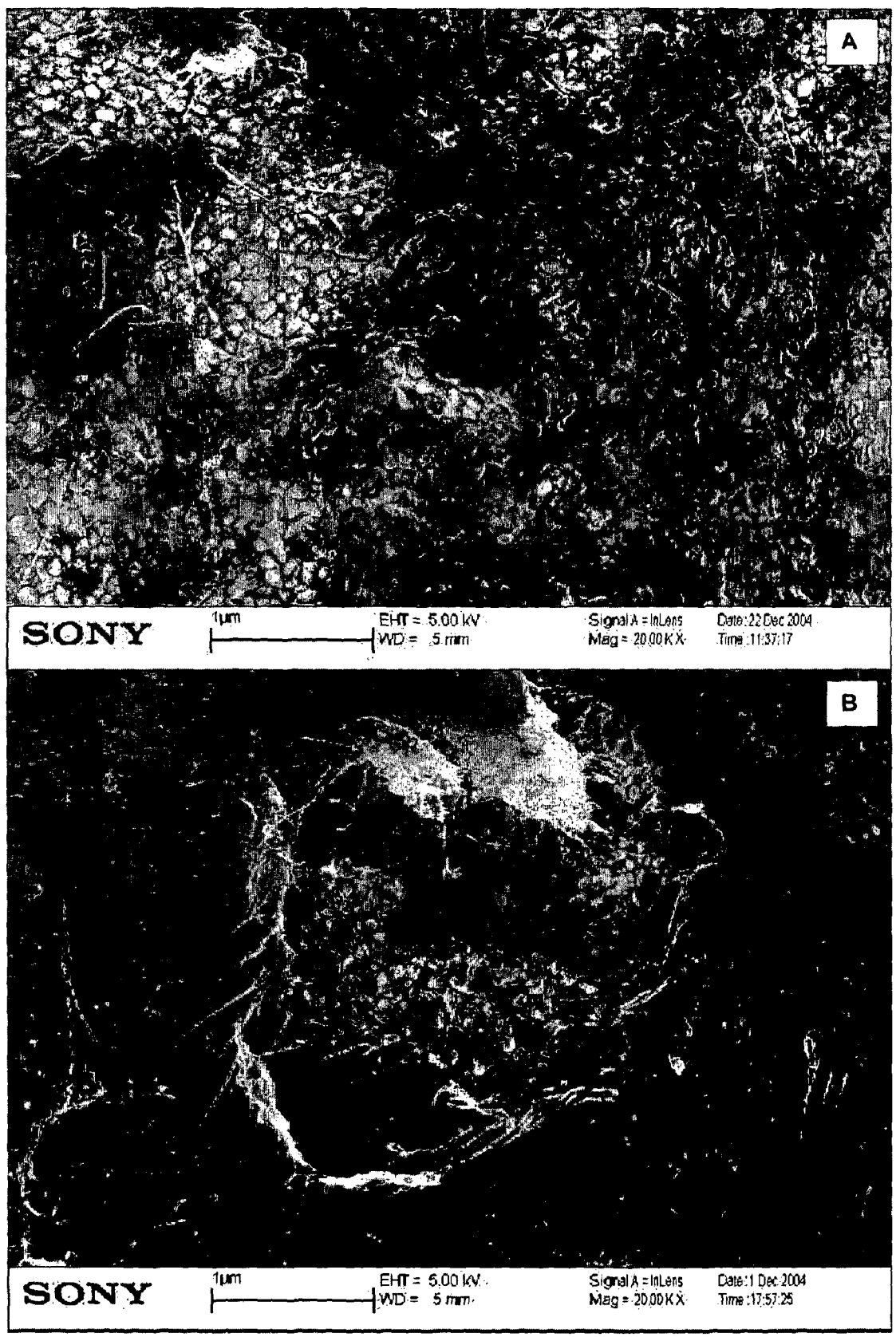

FIG. 21A is an SEM image of the U-SWNT-$CaCO_3$ composite material prepared by adding $CaCl_2$ solution to $Na_2CO_3$ solution and deposited onto an FTO substrate according to Example 5, followed by treatment with HCl vapor to dissolve the $CaCO_3$ component according to Example 9, followed by treatment with UV-curable dicing tape to lift the SWNTs according to Example 10. Magnification: 20000×.

FIG. 21B is an SEM image of the UA-SWNT-$CaCO_3$ composite material prepared by adding $CaCl_2$ solution to $Na_2CO_3$ solution and deposited onto an FTO substrate according to Example 5, followed by treatment with 1 M HCl solution to dissolve the $CaCO_3$ component according to Example 9, followed by treatment with UV-curable dicing tape to lift the SWNTs according to Example 10. Magnification: 20000×.

Figure 22:
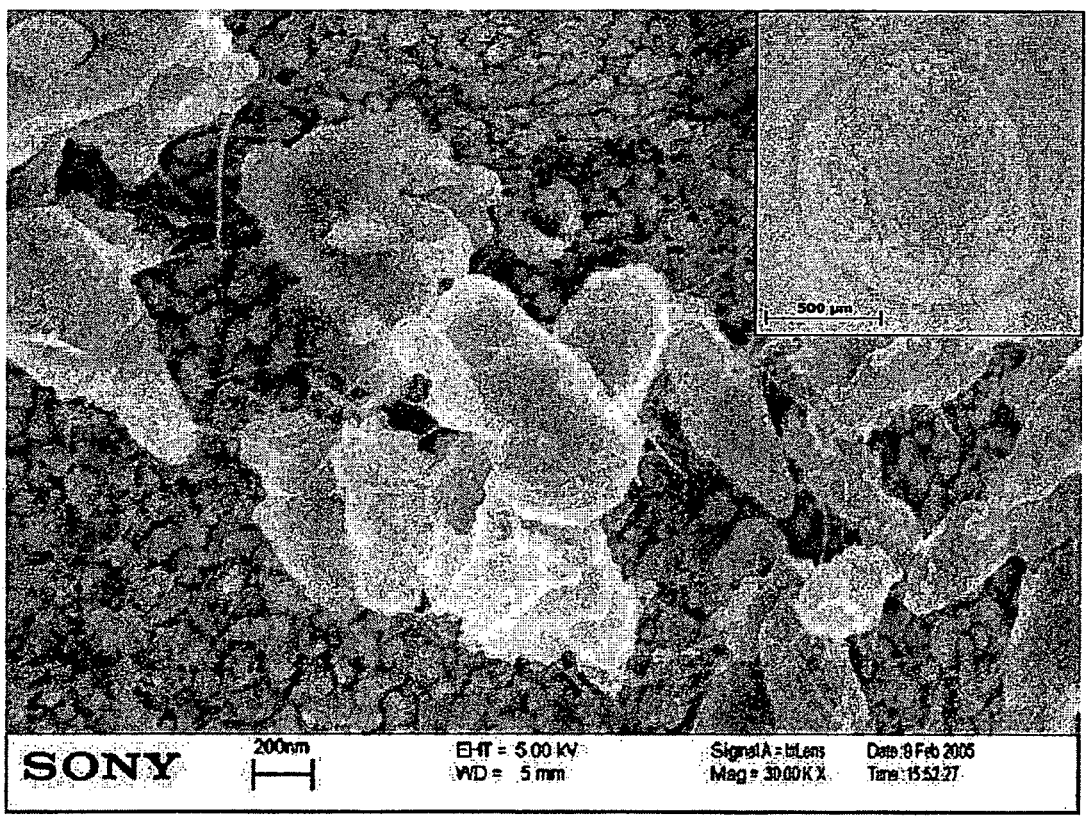

FIG. 22 is an SEM image the U-SWNT-$CaCO_3$ composite material obtained by adsorption onto precipitated calcium carbonate powder from Merck and deposited onto an FTO-glass substrate according to Example 6, followed by treatment with UV-curable dicing tape to lift the SWNTs according to Example 11. Magnification: 30000× and 50× (inset).

Figure 23:
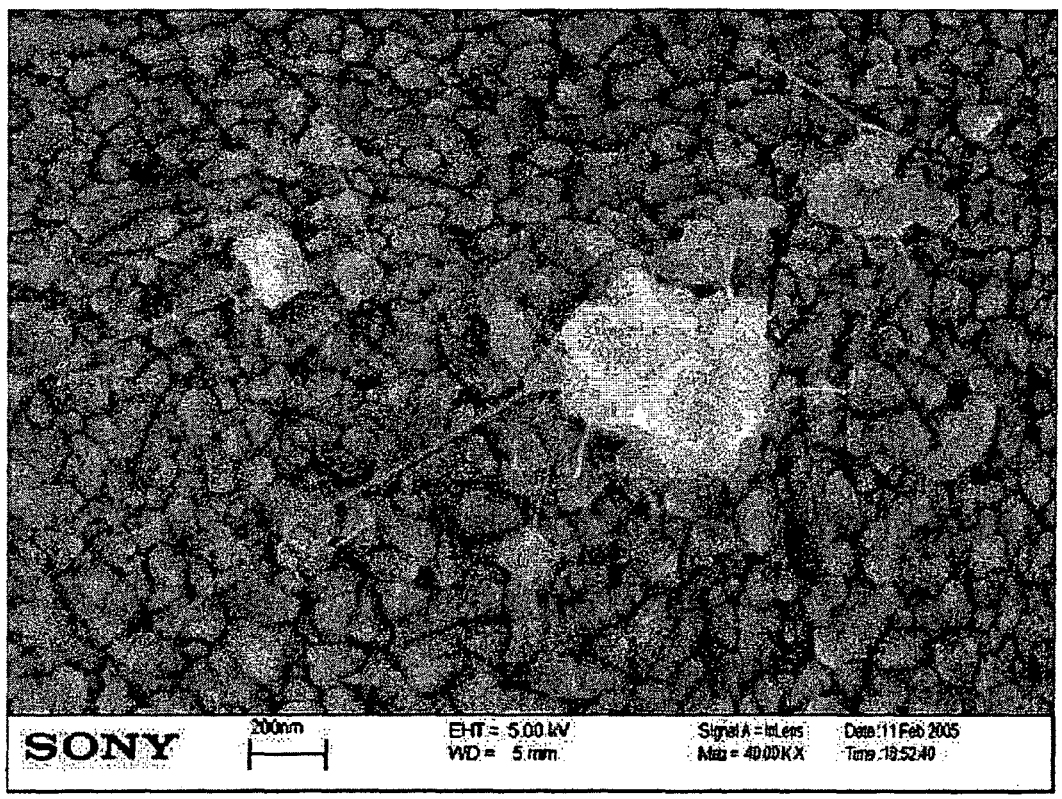

FIG. 23 is an SEM image the U-SWNT-$CaCO_3$ composite material obtained by adsorption onto precipitated calcium carbonate powder from NanoMaterials Technology and deposited onto an FTO-glass substrate according to Example 6, followed by treatment with UV-curable dicing tape to lift the SWNTs according to Example 11. Magnification: 40000×

FIG. 24A is schematic diagram of the sample and probe configuration in the field emission measurement system.

FIG. 24B is a schematic diagram of the electronic circuitry in the field emission measurement system, where $V_s$ represents the supplied voltage and $V_c$ represents the voltage across the current measurement resistor (10 k$\Omega$).

Figure 25:
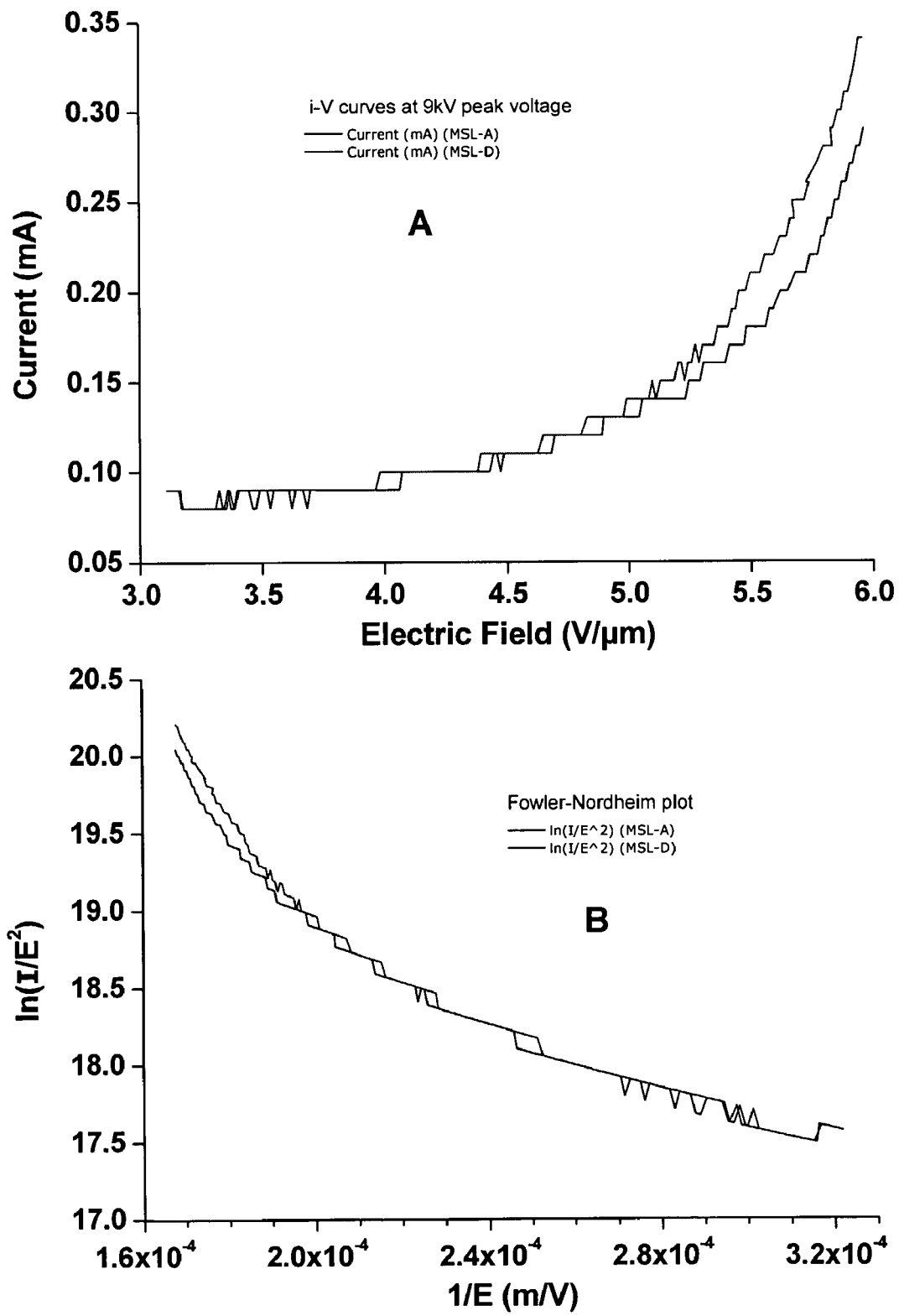

FIG. 25A are plots of the current versus macroscopic electric field obtained from two samples at a peak voltage of 9 kV (pulsed voltage mode). The samples were prepared with silicon substrates according to the processes described in Example 4 (preparation of SWNT-$CaCO_3$ composite material via diffusion of ammonium carbonate vapor), Example 7 (treatment with a bath of 0.25 M sulfuric acid to remove the $CaCO_3$ component), and Example 10 (activation with Scotch adhesive tape).

FIG. 25B are Fowler-Nordheim plots of the data shown in FIG. 25A.

Figure 26:
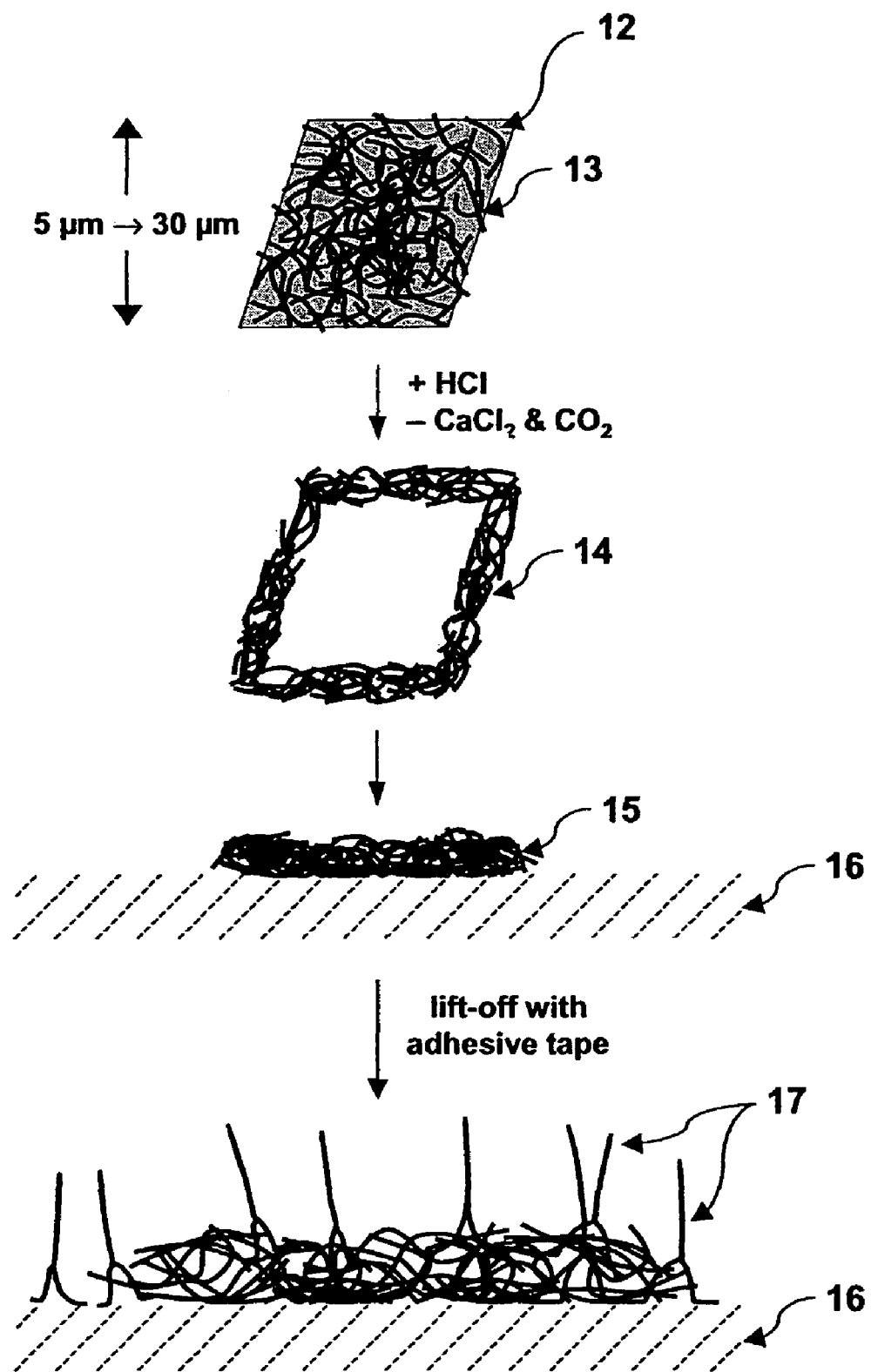

FIG. 26 is a schematic representation of steps in the production of a cathode for electron field emission based on the processes described in Examples 4-5 (preparation of CNT-$CaCO_3$ composite material via co-precipitation), Examples 7-9 (acid treatment to remove the $CaCO_3$ component), and Example 10 (activation with adhesive tape) (not drawn to scale). 12: $CaCO_3$ phase, 13: CNT phase, 14: CNT shell, 15: CNT mat, 16: conductive substrate, 17: CNT electron field emitter sites.

Figure 27:
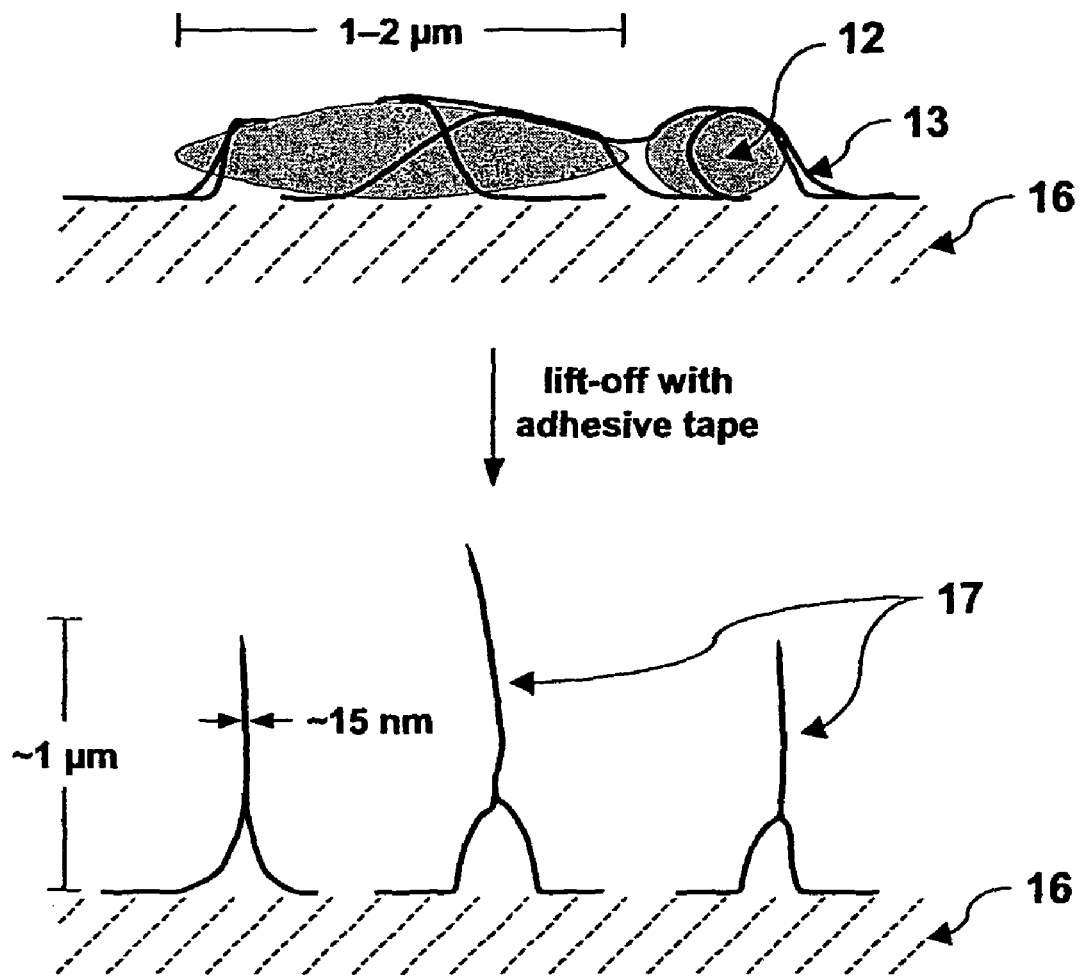

FIG. 27 is a schematic representation of steps in the production of a cathode for electron field emission based on the processes described in Example 6 (preparation of CNT-$CaCO_3$ composite material via adsorption) and Example 11 (activation with adhesive tape) (not drawn to scale). 16: conductive substrate, 12: $CaCO_3$ phase, 13: CNT phase, 17: CNT electron field emitter sites.

Figure 28:
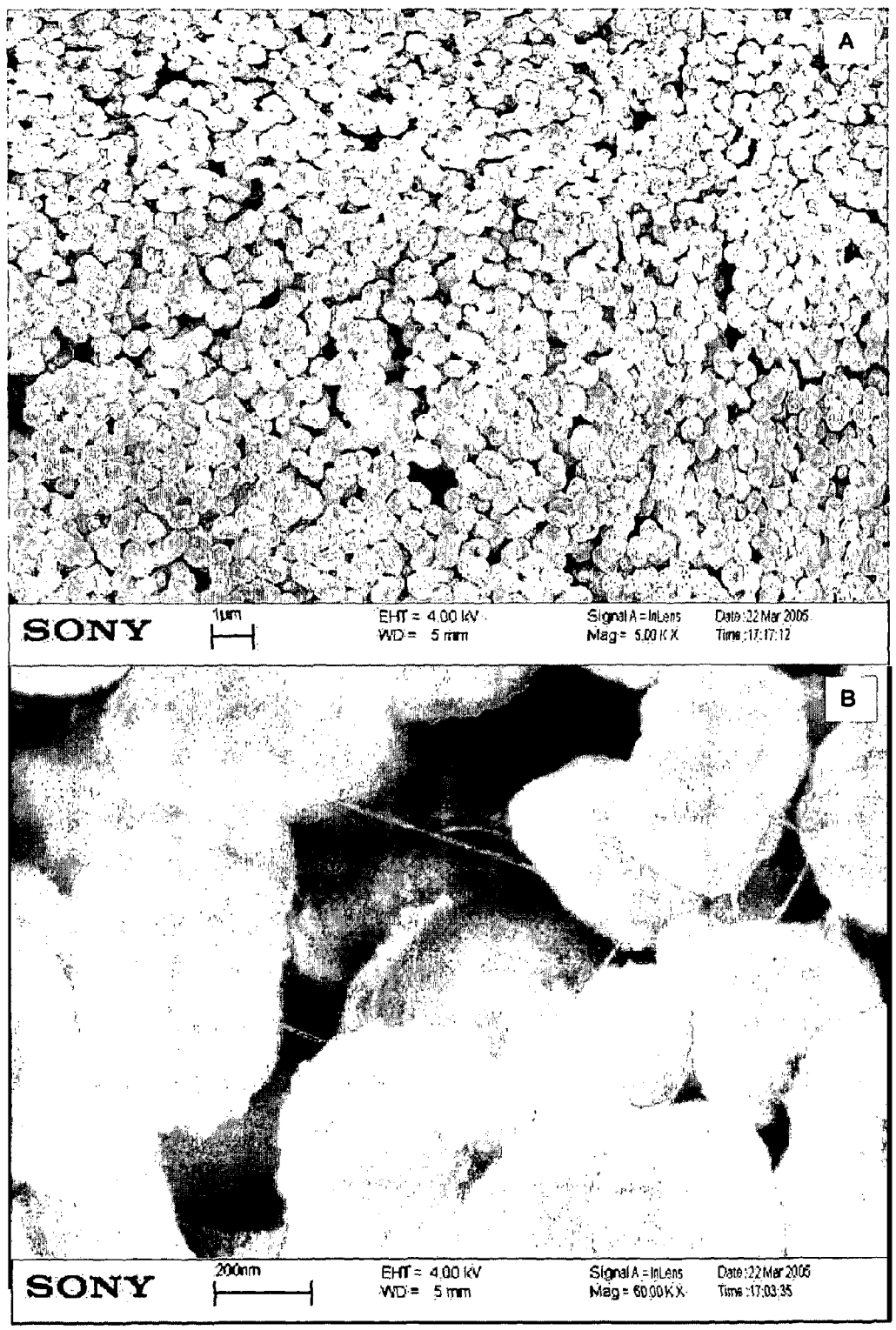

FIG. 28 are SEM images of a UA-SWNT-$MnCO_3$ composite material prepared by adding $MnCl_2$ solution to a $Na_2CO_3$ solution and deposited onto an FTO substrate according to Example 13. Magnification: 5000× (A) and 60 000× (B).

Figure 29:
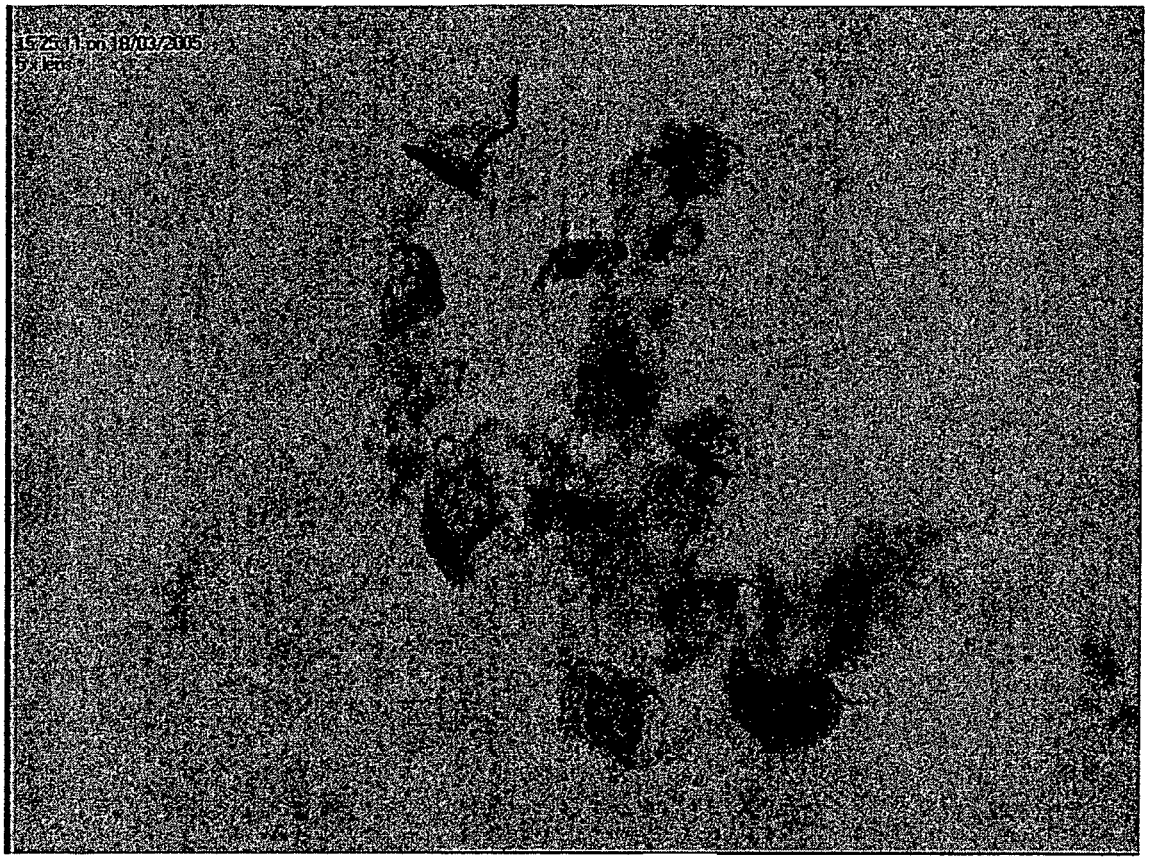

FIG. 29 is an image obtained by optical microscopy showing a suspension of carbon nanotube shells obtained by dissolving the $CaCO_3$ component of a U-SWNT-$CaCO_3$ composite material with aqueous HCl solution according to Example 8. The composite material used was the same as shown in FIG. 10B. Magnification: 500×.

Reference is now made to the following examples, which are given to illustrate, not to limit the invention. These examples provide methods for: preparing water-soluble SWNTs from acid-purified SWNTs using molten urea (Examples 1-3), preparing SWNT-$CaCO_3$ composite materials by diffusion of $(NH_4)_2CO_3$ vapor into aqueous solutions of $CaCl_2$ (Example 4), preparing SWNT-$CaCO_3$ composite materials by mixing aqueous solutions of $Na_2CO_3$ and $CaCl_2$ (Example 5), preparing SWNT-$CaCO_3$ composite materials by adsorption to $CaCO_3$ powder (Example 6), removal of the $CaCO_3$ component of SWNT-$CaCO_3$ composites using acids (Examples 7-9), lifting of SWNTs from mats using adhesive tape (Example 10), lifting of SWNTs from composites using adhesive tape (Example 11), demonstration of field emission from samples prepared according to the above procedures (Example 12), preparing SWNT-$MnCO_3$ composite materials by mixing aqueous solutions of $Na_2CO_3$ and $MnCl_2$ (Example 13), and preparing SWNT-$VOCO_3$ composite materials by mixing aqueous solutions of $Na_2CO_3$ and $VOSO_4$ (Example 14). The carbon nanotubes used in these examples were experimental samples of pre-purified SWNTs obtained from Carbon Solutions, Inc., Riverside, Calif. (either batch number 03-101a or batch number 03-102), which were produced by a modified electric-arc method and acid-purified followed by an additional purification step. The resulting concentration of acidic sites was in the range of 4-6 atomic %.

Images of the SWNTs obtained by transmission electron microscopy (TEM) and scanning electron microscopy (SEM) after solubilization with molten urea show that they contain appreciable amounts of amorphous carbon and other carbonaceous impurities. Concentrations (mg/L) of the SWNTs were estimated by dividing the absorbance (after dilution, 1 cm optical path length) at 800 nm by the factor 0.019 (Bahr et al., *Chemical Communications* 2001, 193). Although the examples given herein focus on carbon nanotube composite materials with calcium carbonate ($CaCO_3$), it is clear to someone skilled in the art that the teaching provided therein can be readily extended to other insoluble or sparingly soluble Me-carbonates, listed further above and as exemplified by $MnCO_3$ in Example 13 and by $VOCO_3$ in Example 14

EXAMPLE 1

Preparation of U-SWNTs

This procedure provided water-soluble SWNTs by reacting functional groups on acid-purified SWNTs with reactive species present in molten urea.

Pre-purified SWNTs (batch number 03-101a)) (3.3 mg) were mixed with urea (130 mg) and heated at ~150° C. for 7 minutes. After cooling to room temperature, the resulting mass was extracted with water (1 mL) to yield a black-brown solution. Sodium perchlorate monohydrate (25 mg) was added to the extract and vortex-mixed briefly to dissolve it completely. The mixture was left overnight at room temperature and centrifuged (5000 rpm for 10 minutes) the following day. After removing the supernatant solution, the resultant solid washed by suspending it in methanol (1 mL) via bath sonication (1 minute) followed by centrifugation (5000 rpm for 10 minutes). An attempt to wash the solid a second time with methanol (1 mL) caused most of it to dissolve. The resulting solution of U-SWNTs, which was stable indefinitely towards precipitation, had SWNT content corresponding to a concentration of approximately 310 mg/L. Based on the volume of the extract and its estimated concentration, the percentage of SWNTs solubilized during this procedure was 13%. The U-SWNTs had excellent solubility in water (3 g/L) and in methanol (1 g/L). Images of the U-SWNT material obtained by TEM (e.g., FIG. 4A) showed it to contain bundles of SWNTs as well as amorphous carbon and carbon onions with or without enclosed metal catalyst particles. The bundles were fairly uniform in diameter (10-20 nm) and typically $\leq 1$ µm in length. Infrared absorption spectra (e.g., FIG. 5A) indicated the presence of urea-like functional groups on the U-SWNTs. The ultraviolet-visible absorption spectrum of the aqueous solution had a maximum at 235 nm (e.g., FIG. 6A).

EXAMPLE 2

Preparation of UA-SWNTs

This procedure provided water-soluble SWNTs by reacting functional groups on acid-purified SWNTs with reactive species present in molten urea plus para-anisaldehyde.

A mixture of pre-purified SWNTs (batch number 03-101a) (15.6 mg) and urea (629 mg) was initially heated at ~150° C. for 2.5 minutes until completely molten. Heating was stopped while para-anisaldehyde (114 µL) was added, and then continued for 6 minutes. After cooling to room temperature, soluble material was extracted from the resulting mass, first 11 times with water (1 mL each) and then 6 times with methanol (1 mL each). UA-SWNTs were isolated from the methanol extracts by 3 cycles of precipitation with sodium perchlorate monohydrate and dispersion in ethanol, followed by dissolution in methanol. Based on the volumes of the extracts and their estimated concentrations, the percentage of nanotubes solubilized during this procedure was 50%. The solubility of UA-SWNTs was similar to that of U-SWNTs. Images obtained by TEM and SEM (e.g., FIG. 4B) showed it contained bundles of nanotubes with dimensions similar to the U-SWNT material. Infrared absorption spectra (e.g., FIG. 5B) indicated the presence of urea-like functional groups on the UA-SWNTs. The ultraviolet-visible absorption spectrum of the aqueous solution of the UA-SWNTs had maxima at 224 nm and 276 nm due to residual para-anisaldehyde and/or related species (e.g., FIG. 6B). After gel-filtration to remove these residuals, the spectrum had a maximum at 246 nm with a shoulder at about 270 nm.

EXAMPLE 3

Preparation of UA-SWNTs

This procedure was similar to that in Example 2, but with reduced (by one-half) amounts of urea and para-anisaldehyde relative to SWNTs.

A mixture of pre-purified SWNTs (batch number 03-102) (3.5 mg) and urea (70 mg) was initially heated at ~150° C. for 2 minutes until completely molten. Heating was stopped while para-anisaldehyde (12.6 µL) was added, and then continued for 6 minutes. After cooling to room temperature, soluble material was extracted from the resulting mass, first with water (1 mL) and then 2 times with ethanol (1 mL each). UA-SWNTs were isolated from the ethanol extracts by 2 or 3 cycles of precipitation with sodium perchlorate monohydrate, respectively, followed by dissolution in water. Based on the volumes of the extracts and their estimated concentrations, the percentage of nanotubes solubilized during this procedure was 50%.

EXAMPLE 4

Preparation of $CNT-CaCO_3$ Composite Materials by Diffusion of $(NH_4)_2CO_3$ Vapor into Aqueous Solutions of $CaCl_2$ This procedure provided composite materials containing U-SWNTs or UA-SWNTs and crystalline calcium carbonate, using $CaCl_2$ as the soluble non-carbonate source of calcium ion and the vapor from solid ammonium carbonate as the soluble source of carbonate ion.

A solution of calcium chloride (30 mM, 0.3 mL) in water was mixed with a solution of U-SWNTs or UA-SWNTs in water (0.7 mL) in a 2-mL polypropylene vial. The approximate concentration of nanotubes before mixing with the calcium chloride solution was 4-5 mg/L (e.g., as in FIG. 6). Ammonium carbonate powder (25 mg) was placed at the bottom of a 25-mL glass beaker together with the open vial containing the solution, and the beaker was sealed tightly with a layer of Parafilm "M" and left at room temperature. Formation of a precipitate in the vial was evident within 30 minutes. After 1.5-2.5 hours, the vial was removed from the beaker, capped, and stored at room temperature. To compact the precipitate, the sample was centrifuged (5000 rpm for 5 minutes), yielding a black solid and colorless supernatant. The centripetal force and pressure exerted on the composite material during centrifugation were approximately 40 N and 2 MPa, respectively.

To remove excess salts, the colorless supernatant was removed and the solid was suspended in water (1 mL) by vortex mixing and again compacted by centrifugation. This washing step was repeated once.

The composite materials obtained by the above procedures were examined by SEM after depositing them onto conductive substrates. If the solids had not previously been washed to remove excess salts, they were washed twice with 10-μL aliquots of water while on the substrate before being imaged. Representative SEM images of as-prepared U-SWNT-$CaCO_3$ composites and UA-SWNT-$CaCO_3$ composites deposited via pipette onto silicon substrates are presented in FIG. 7A and FIG. 7B, respectively.

The as-prepared U-SWNT-$CaCO_3$ composites comprised mostly rhombohedral crystals whose largest faces (corresponding to the {1014} growth plane of calcite) were typically 20-60 μm wide (FIG. 7A). Compared to U-SWNT-$CaCO_3$, the UA-SWNT-$CaCO_3$ crystalline composites were less compact and much more polydisperse in size and shape; the larger particles (up to 100 μm in size) appeared to comprise assemblies of smaller rhombohedral units (down to 5 μm in size) (FIG. 7B). Based on the amounts of reagents used in the preparation, the carbon nanotubes are estimated to comprise 0.35% of the total weight of solids in the composite material.

Figure 7:

Dark patches on the substrate surface in FIG. 7, which were associated with the composite particles, were mats of intertwined nanotubes. These mats appeared to help anchor the particles to the surface.

In some cases, the composite materials were crushed mechanically after they had been deposited onto the substrate and dried. The SEM image in FIG. 8 shows the edge of a U-SWNT-$CaCO_3$ composite particle that was crushed in this manner. The composite nature of the material was clearly revealed by the angular edge at the left side, reflecting the influence of the crystalline $CaCO_3$ component, and the fibers extending from and between the fragmented particle, which were due to the nanotube component of the composite.

In some cases, the composite materials were crushed mechanically by grinding the powders suspended in a small volume of water with a stirring rod for several minutes. SEM images of the crushed composite materials spotted onto silicon substrates using the number "0" pen of a lettering set (K+E Leroy) are presented in FIG. 9A and FIG. 9B, respectively. These images showed that the composites crushed by this procedure were fragmented into pieces having a wide range of size and shape. The spots where the crushed composites were deposited were generally round shaped with diameters similar to that of the orifice of the #0 pen (0.35 mm).

EXAMPLE 5

Preparation of CNT-$CaCO_3$ Composite Materials by Mixing Aqueous Solutions of $Na_2CO_3$ and $CaCl_2$ This procedure provided composite materials containing U-SWNTs or UA-SWNTs and crystalline calcium carbonate, using calcium chloride as the soluble non-carbonate source of calcium ion and sodium carbonate as the soluble source of carbonate ion.

A solution of sodium carbonate (0.33 M, 100 μL) in water was added to a solution of calcium chloride (0.33 M, 100 μL) in water, while stirring with a vortex mixer, in a 2-mL polypropylene vial, producing a milky suspension. After 1 minute, a solution of U-SWNTs or UA-SWNTs in water (6 μL) was added to the resulting milky suspension, while stirring with a vortex mixer. The approximate concentration of nanotubes in the aqueous solutions before mixing was 1700-1800 mg/L. After 10-20 minutes, the suspension was compacted by centrifugation (5000 rpm for 10 minutes), yielding a black solid and colorless supernatant. The centripetal force and pressure exerted on the composite material during centrifugation were approximately 8 N and 0.4 MPa, respectively. The supernatant in the preparation of the U-SWNT-$CaCO_3$ composite had a pH value of 6-7, while the supernatant in the preparation of the UA-SWNT-$CaCO_3$ composite had a pH value of 8-9.

Alternatively, composite materials containing carbon nanotubes and crystalline calcium carbonate were obtained when the order of mixing of the sodium carbonate and calcium chloride solutions was reversed from above, i.e., the solution of $CaCl_2$ was added to the solution of $Na_2CO_3$. The supernatant after centrifugation in the preparation of the U-SWNT-$CaCO_3$ composite had a pH value of 7-8, while the supernatant in the preparation of the UA-SWNT-$CaCO_3$ composite had a pH value of 6-7.

To remove excess salts from the above composite materials, the supernatants were removed, and the solids were suspended in water (200 μL) using an ultrasonic bath briefly (approximately 2 seconds) and collected by centrifugation (5000 rpm for 10 minutes). The centripetal force and pressure exerted on the composite material during centrifugation were approximately 8 N and 0.4 MPa, respectively.

The composite materials obtained by the above procedures were examined by electron microscopy after depositing them onto fluorine-doped tin dioxide (FTO) on glass substrates (Pilkington PLC, TEC-15). The composite materials were deposited as dots using glass capillary tubes with 0.6-mm inner diameters (Marienfeld GmbH, catalogue number 2930203). Representative SEM images of U-SWNT-$CaCO_3$ composites and UA-SWNT-$CaCO_3$ composites are presented in FIG. 10 and FIG. 11, respectively.

The images obtained by SEM showed that the composite materials were deposited in nearly circular spots with diameters similar to the capillary tube. The sizes of the composite particles within each preparation were fairly uniform, i.e., 4-7 μm (FIG. 10A), 20-30 μm (FIG. 10B), 15-25 μm (FIG. 11A), and 8-12 μm (FIG. 11B), and the shapes were generally twisted or twined rhombohedrons. The variations in size between the preparations appeared to be correlated with the pH values of the supernatants: the smaller particles (4-12 μm) were obtained with slightly acidic to neutral (pH 6-7) conditions while the larger particles (15-30 μm) were obtained with neutral to slightly basic (pH 7-9) conditions. Based on the amounts of reagents used in the preparation, the carbon nanotubes are estimated to comprise 0.32% of the total weight of solids in the composite material.

EXAMPLE 6

Preparation of CNT-$CaCO_3$ Composite Materials by Adsorption onto $CaCO_3$ Powder This procedure provided composite materials containing U-SWNTs or UA-SWNTs and crystalline calcium carbonate, using precipitated $CaCO_3$ powder as the source of calcium carbonate.

A powder of precipitated $CaCO_3$ (0.55 mg) (Merck KGaA, product number 102069) was placed in a 2-mL polypropylene vial, to which a solution of U-SWNTs in water (10 μL) as well as pure water (20 μL) was added. The approximate concentration of nanotubes in the solution added to the vial was approximately 1800 mg/L. The mixture was mechanically mixed and grinded well with a stirring rod, and the resulting suspension was centrifuged (5000 rpm for 10 minutes) to give a black precipitate and clear, black-brown supernatant. The centripetal force and pressure exerted on the composite material during centrifugation were approximately 1 N and 0.06 MPa, respectively. The supernatant was removed and diluted with water to estimate its nanotube content by UV-visible absorption. The supernatant was estimated to contain approximately 15% of the original CNTs, i.e., 85% of the nanotubes were present in the U-SWNT-$CaCO_3$ composite material. The composite material was washed, after removing the supernatant, by resuspending it in water (50 µL) with grinding, and then it was concentrated by centrifugation. The supernatant after the washing step was colorless, indicating strong adsorption between the nanotubes and $CaCO_3$ in the composite material.

Another composite material containing U-SWNTs and crystalline calcium carbonate was prepared similarly using uncoated precipitated calcium carbonate (NanoMaterials Technology Pte Ltd, product NPCC-UNC). The supernatant obtained from the suspension of U-SWNTs and 0.66 mg of calcium carbonate powder was estimated to contain approximately 16% of the original CNTs, i.e., 84% of the nanotubes were present in the U-SWNT-$CaCO_3$ composite material.

Representative SEM images of the U-SWNT-$CaCO_3$ composites obtained in this example are presented in FIG. 12 and FIG. 13. After being dispersed using an ultrasonic bath briefly (approximately 5 second), the composite materials were deposited as aqueous suspensions onto FTO substrates using glass capillary tubes (Marienfeld GmbH, catalogue number 2930203). In both cases, the composites comprised loose networks of carbon nanotubes adsorbed to and interlinking $CaCO_3$ crystals, which were generally spindle-shaped and 1-2 µm long in the case of precipitated calcium carbonate from Merck (FIG. 12) and generally cubic shaped with edge lengths of approximately 100 nm in the case of precipitated calcium carbonate from NanoMaterials Technology (FIG. 13). Nanotubes within the composites were also adsorbed to the FTO surface (FIG. 12 and FIG. 13). Based on the amounts of reagents used in the preparation, the carbon nanotubes are estimated to comprise 2.8% of the total weight of solids in the composite material.

Preparations of composite materials using precipitated calcium carbonate powder from Merck and UA-SWNTs gave results similar to those with U-SWNTs.

EXAMPLE 7

Removal of the $CaCO_3$ Component of CNT-$CaCO_3$ Composite Materials Using Baths of Acidic Aqueous Solutions This procedure provided a means of removing the calcium carbonate component from CNT-$CaCO_3$ composites on substrates using a mineral acid bath, leaving adherent films of nanotubes.

CNT-$CaCO_3$ composite materials prepared by the ammonium carbonate diffusion method and deposited onto substrates according to the procedures described in Example 4 were placed face-up at the bottom of a 5-mL glass beaker containing aqueous solutions (~2 mL) of either sulfuric acid (0.25 M) or hydrochloric acid (1 M) and left undisturbed for 10-30 minutes. The substrates were then transferred to a 10-mL glass beaker containing water and left undisturbed for 0.5-2 minutes to remove any remaining salts. This water-rinsing step was repeated once, and then the substrates were dried in air. Images obtained by SEM showed that the acid treatment by this procedure removed the $CaCO_3$ component completely, leaving mats of intertwined nanotubes whose shapes generally resembled those of the precursor CNT-$CaCO_3$ composite particles, but which had collapsed and folded onto themselves or onto the substrate and often burst open due to the release of $CO_2$ during the decomposition of the $CaCO_3$ component (e.g., FIGS. 14-16). The residue left after treatment with sulfuric acid solution sometimes also included angular blade-like crystals, which probably comprised crystalline calcium sulfate hydrate (gypsum).

When acid baths were used to remove the $CaCO_3$ component from the composites, as described above, the nanotube component tended to become detached from the substrate and lost in the bath. The following two examples provided alternative procedures for exposing the CNT-$CaCO_3$ composites to HCl that reduced the loss of the nanotubes.

EXAMPLE 8

Removal of the $CaCO_3$ Component of CNT-$CaCO_3$ Composite Materials by Titrating with Small Volumes of Acidic Aqueous Solutions This procedure provided a means of removing the calcium carbonate component partially or completely from CNT-$CaCO_3$ composites on substrates by using controlled amounts of acid solution, leaving adherent films of nanotubes. A suspension of hollow shells comprising carbon nanotubes is obtained as an intermediate before the drying step during this procedure. CNT-$CaCO_3$ composite materials were prepared using aqueous solutions of sodium carbonate and calcium chloride, and deposited onto FTO-glass substrates, according to the procedures described in Example 5.

Small (1-2 µL) aliquots of an aqueous solution of hydrochloric acid (1 M HCl) were applied to the substrates until the regions where the composite particles were located were barely covered by liquid. After approximately 2 hours, the substrates were dried in an oven at 80° C. in a closed container with $CaCl_2$ powder as desiccant for 15 minutes. Salts were removed by placing the substrates into a water bath for 30 minutes, followed by brief immersion into a second water bath.

The extent to which the $CaCO_3$ component was removed depended on the stoichiometry of the reaction: $2HCl + CaCO_3 \rightarrow CaCl_2 + CO_2 + H_2O$. Under the conditions used in this example, the $CaCO_3$ component dissolved completely except near the borders of the liquid, where the $CaCO_3$ component was partially dissolved due to local depletion of HCl.

Figure 17:
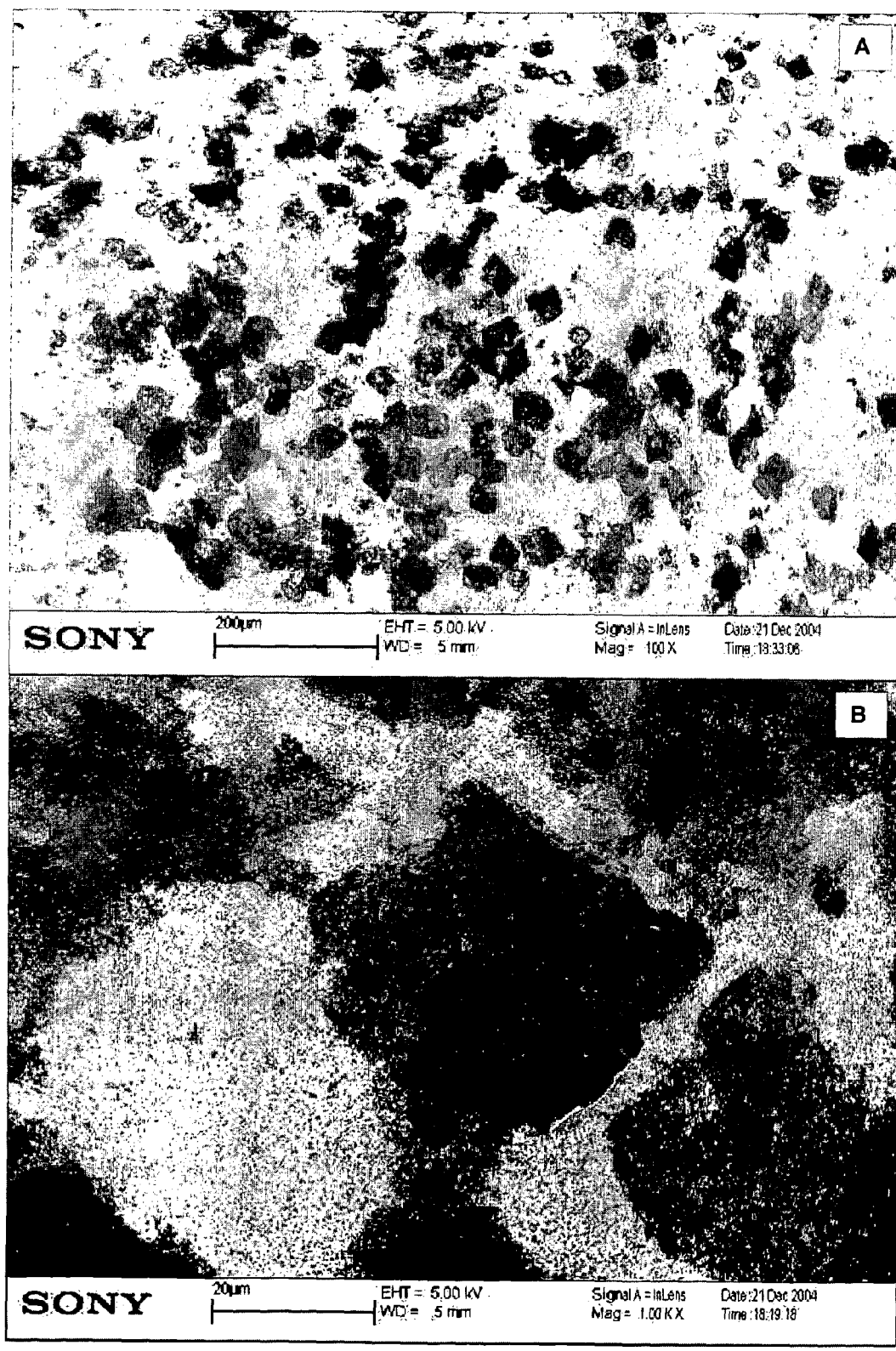
Figure 18:
Figure 19:
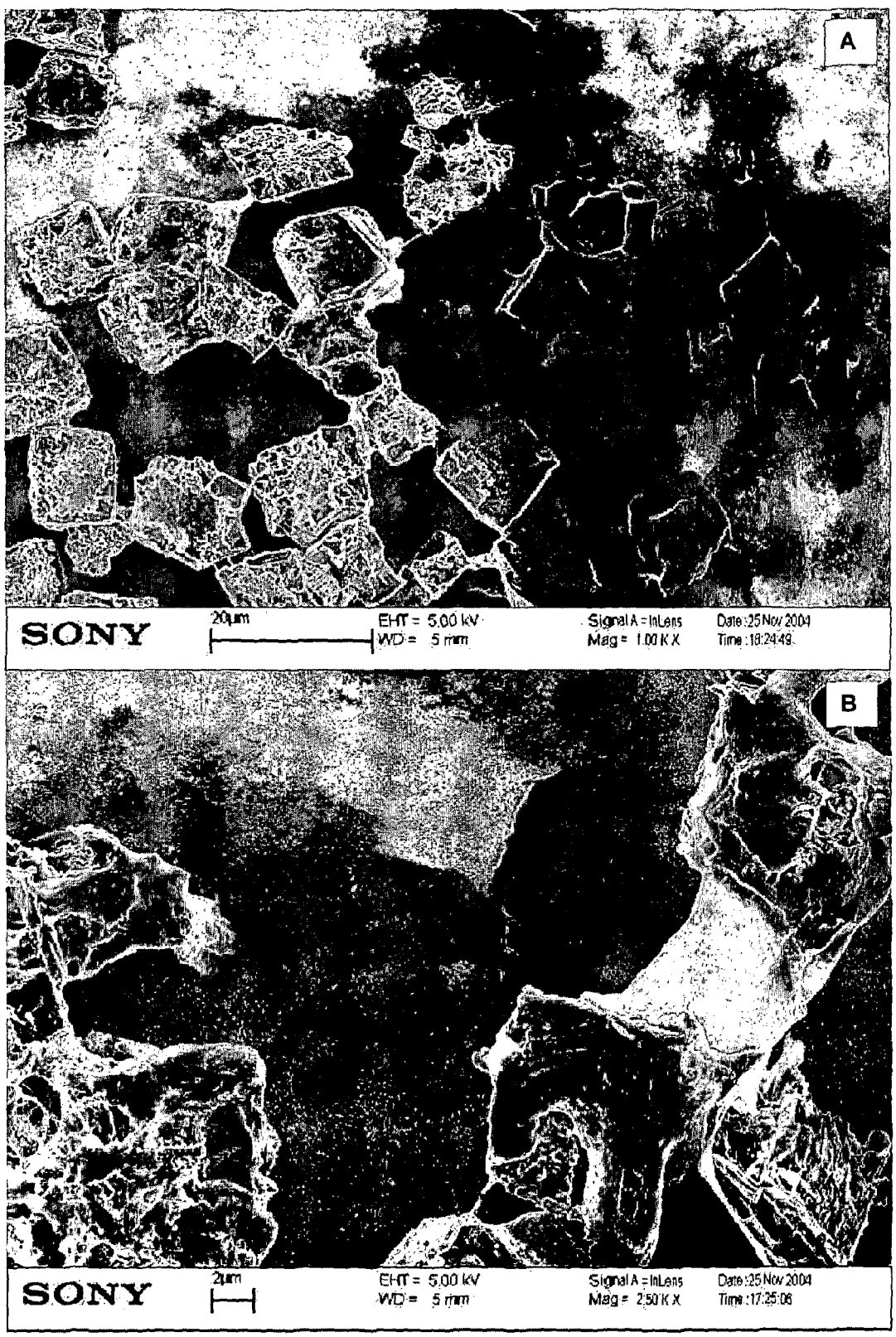

Representative SEM images of U-SWNT-$CaCO_3$ composite crystals treated with aliquots of 1 M HCl according to this example are presented in FIGS. 17-19. Composite particles in which the $CaCO_3$ component was partially dissolved often had shadow-like features around the etched composite (e.g., FIG. 19). These shadow-like features were mats of intertwined nanotubes, which dissociated from the crystal and became attached to the substrate surface during the deposition and acid etching processes.

Optical microscopy of the aqueous suspension obtained after removing the $CaCO_3$ component from U-SWNT-$CaCO_3$ composite crystals, before drying it, revealed shells comprising carbon nanotubes whose general shape and size conformed to that of the original crystalline composite. An example is shown in FIG. 29, where rhombohedral shaped shells are visible the walls of which are composed of nanotubes. Most of the shells in this example appear to have burst due to the rapid release of $CO_2$ when the $CaCO_3$ component decomposed. This rapid release and subsequent rupture of the shells may be avoided by using more dilute and, possibly, buffered acidic solutions, and/or using solutions of chelating agents for $Ca^{2+}$, as outlined further above.

EXAMPLE 9

Removal of the $CaCO_3$ Component of CNT-$CaCO_3$ Composite Materials Using Acidic Fumes This procedure provided a means of removing the calcium carbonate component from CNT-$CaCO_3$ composites on substrates by using controlled amounts of acid vapor, leaving adherent films of nanotubes.

CNT-$CaCO_3$ composites prepared and deposited onto FTO substrates according to Example 5 were placed in a 35×10-mm Petri dish together with 20 µL of 37% HCl, which was contained in a polypropylene cap. The $CaCO_3$ component began decomposing within about 1 minute and decomposed completely within about 10 minutes, leaving CNT mats surrounded by an aqueous solution of $CaCl_2$ where the composites had been located. The $CaCl_2$ could be removed by immersing the substrate in a water bath, but any weakly adhering CNT mats tended to be removed as well. To minimize the loss of the CNT mats, it was best to dry the sample before immersing it into the water bath. Drying could be accomplished, for example, by keeping the sample at 80° C. in a closed container with $CaCl_2$ powder as desiccant for 15 minutes.

EXAMPLE 10

Lifting of CNTs from Mats Using Adhesive Tape

These procedures provided a means of using adhesive tape to remove loosely adhering portions of the film following acid treatment and lift the CNTs so that they protruded vertically from the substrate surface.

The samples from Example 7 were placed face-up on a hard surface, contacted with a piece of Scotch Magic Tape 810 (3M, Inc.), and pressed gently with a finger for ~10 seconds. The tape was removed by peeling it away. Images obtained by SEM showed that the adhesive tape treatment removed most of the mats containing nanotubes and caused several layers to become exposed. The CNTs within these layers were more apparent at higher magnifications, where pointed bundles of nanotubes protruded from torn edges of the mats (e.g., FIG. 20). The bundles were generally around 10-20 nm in diameter and their exposed length was around 0.1-1 µm. The results were largely independent of the nature of the substrate (silicon or gold) or the type of acid (sulfuric or hydrochloric).

The SEM images of samples activated with Scotch Magic Tape 810 revealed oblong-shaped patches of organic residues on the surface, which were presumably residues of the adhesive. To avoid such residues, a UV-curable dicing tape was used instead.

The samples from Examples 8-9 were placed face-up on a hard surface, contacted with a piece of UV-curable dicing tape, and pressed by hand for 1 minute using a flat piece of hard plastic in between for uniform pressure. The tape was exposed to 366-nm light from a portable lamp for 5 minutes before it was peeled away. Images obtained at high magnifications showed that dicing tape was also effective at lifting the CNTs so that they protruded vertically from the substrate surface (e.g., FIG. 21). The single-walled CNTs were in bundles that were generally around 10-20 nm in diameter with lengths around 0.1-1 µm. The density of vertically oriented nanotube bundles in areas where the composite material had been deposited was estimated to be approximately 10 per µm² (e.g., FIG. 21).

EXAMPLE 11

Lifting of CNTs from Composites Obtained by Adsorption to $CaCO_3$ Powder Using Adhesive Tape This procedure provided a means of using adhesive tape to lift the CNTs of composites with $CaCO_3$ powder on substrates so that they protruded vertically from the substrate surface.

The samples from Example 6 were placed face-up on a hard surface, contacted with a piece of UV-curable dicing tape, and pressed by hand for 1 minute using a flat piece of hard plastic in between for uniform pressure. The tape was exposed to 366-nm light from a portable lamp for 5 minutes before it was peeled away. Examination by SEM showed that the adhesive tape treatment removed most of the $CaCO_3$ particles from the composite material (FIG. 22 and FIG. 23). The CNTs were lifted so that they protruded vertically from the substrate whether or not the particles remained. In places where the particles remained on the surface, it was clear that they were kept there due to their interactions with the CNTs, which connected them to the FTO surface (e.g., FIG. 22). The single-walled CNTs were in bundles that were generally around 10-20 nm in diameter with lengths around 0.1-1 µm. The density of vertically oriented nanotube bundles in areas where the composite material had been deposited was estimated to be approximately 10 per µm².

EXAMPLE 12

Field Emission Measurements

These measurements demonstrated that the procedures described in the previous examples provide a means of producing cathodes for electron field emission.

Figure 24:
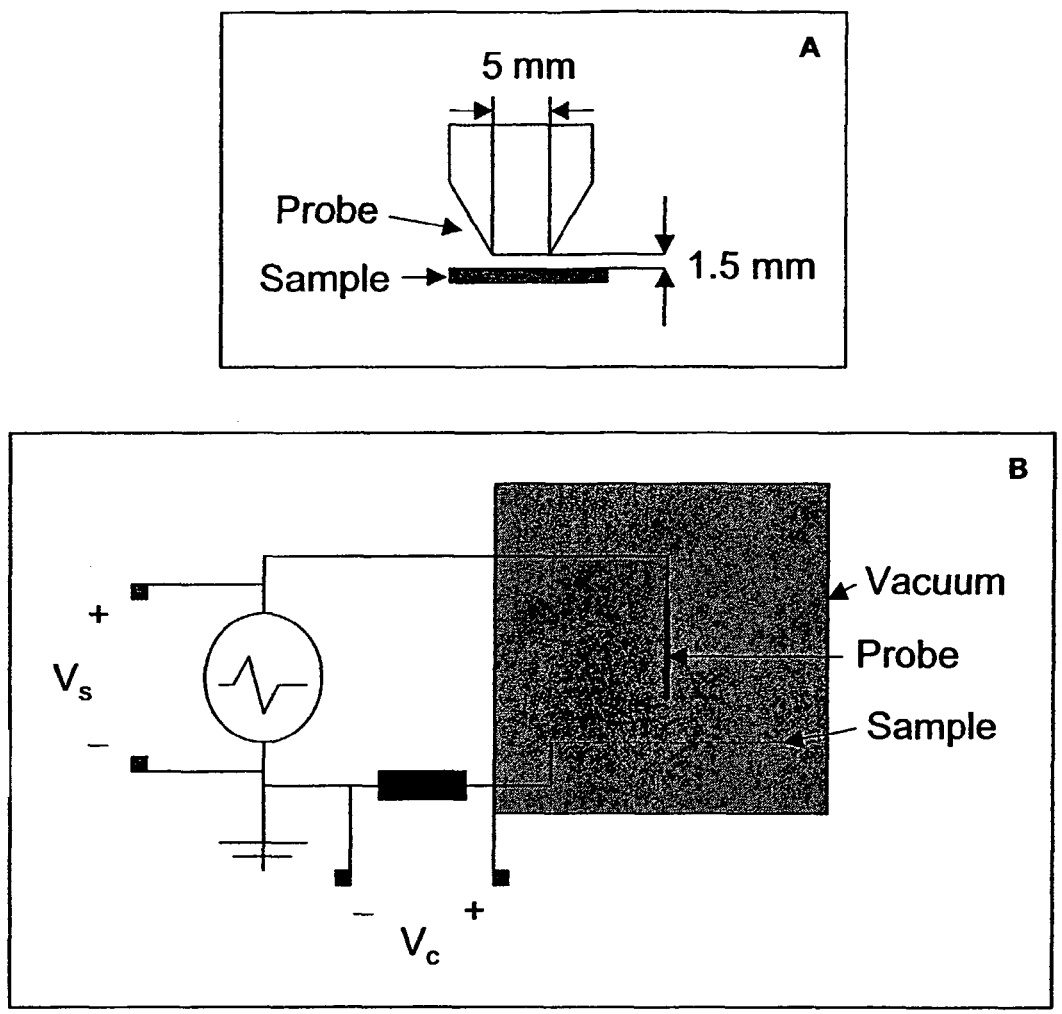

Schematic views of the probe-sample configuration and circuitry of the field emission measurement system are shown in FIG. 24. Either a negative dc voltage or triangle-wave voltage pulses were applied to the base electrode relative to the grounded probe electrode. The pulsed mode operation was with a 4-microsecond pulse width and 100 Hz pulse frequency (40% duty). The measurements were performed with a vacuum level of $7 \times 10^{-6}$ torr and current measurement resistance of 10 kΩ. Results obtained with two samples obtained at a peak voltage of 9 kV are presented in FIG. 25, which shows that they exhibited similar field emission characteristics. The samples were prepared using silicon substrates, U-SWNT-$CaCO_3$ composite materials prepared by the ammonium carbonate diffusion method (Example 4), removal of the $CaCO_3$ component with a bath of 0.25 M sulfuric acid (Example 7), and lifting of nanotubes from mats after acid treatment with Scotch adhesive tape (Example 10).

FIGS. 26 and 27 are schematic representations of steps in the production of cathodes for electron field emission based on processes described in Examples 1-11.

EXAMPLE 13

Preparation of CNT-$MnCO_3$ Composite Materials by Mixing Aqueous Solutions of $Na_2CO_3$ and $MnCl_2$ This procedure provided composite materials containing UA-SWNTs and manganese carbonate, using manganese chloride as the soluble non-carbonate source of manganese ion and sodium carbonate as the soluble source of carbonate ion.

A solution of manganese chloride (0.33 M, 100 μL) in water was added to a solution of sodium carbonate (0.33 M, 100 μL) in water, while stirring with a vortex mixer, in a 2-mL polypropylene vial, producing a milky suspension. After 1 minute, a solution of UA-SWNTs in water (11 μL) was added to the suspension, while stirring with a vortex mixer. The approximate concentration of nanotubes in the aqueous solutions before mixing was 470 mg/L. After 20 minutes, the suspension was compacted by centrifugation (5000 rpm for 10 minutes), yielding a light gray solid and colorless supernatant, indicating that the nanotubes were essentially quantitatively combined with the thus obtained solid composite material. The centripetal force and pressure exerted on the composite material during centrifugation were approximately 8 N and 0.4 MPa, respectively. The supernatant had a pH value of approximately 7.

To remove excess salts from the UA-SWNT-$MnCO_3$ composite material, the supernatant was removed, and the solid was suspended in water (200 μL) using an ultrasonic bath briefly (approximately 2-3 seconds) and collected by centrifugation (5000 rpm for 10 minutes). The centripetal force and pressure exerted on the composite material during centrifugation were approximately 8 N and 0.4 MPa, respectively. This washing process was repeated once. The composite was examined by electron microscopy after depositing some of the suspension onto fluorine-doped tin dioxide (FTO) on glass substrates (Pilkington PLC, TEC-15) via a micropipette.

Representative SEM images of the UA-SWNT-$MnCO_3$ composites obtained in this example are presented in FIG. 28. The composite comprised loose networks of carbon nanotubes adsorbed to and interlinking particles of $MnCO_3$. The particles were fairly uniform in size and shape, being roughly spherical with diameters of approximately 0.5 μm. Based on the amounts of reagents used in the preparation, the carbon nanotubes are estimated to comprise 0.14% of the total weight of solids in the composite material.

EXAMPLE 14

Preparation of CNT-$VOCO_3$ Composite Materials by Mixing Aqueous Solutions of $Na_2CO_3$ and $VOSO_4$ This procedure provided composite materials containing UA-SWNTs and vanadyl carbonate, using vanadyl sulfate as the soluble non-carbonate source of vanadyl ion and sodium carbonate as the soluble source of carbonate ion.

A solution of vanadyl sulfate (0.33 M, 100 μL) in water was added to a solution of sodium carbonate (0.33 M, 100 μL) in water, while stirring with a vortex mixer, in a 2-mL polypropylene vial, producing a brown suspension. After 1 minute, a solution of UA-SWNTs in water (11 μL) was added to the suspension, while stirring with a vortex mixer. The approximate concentration of nanotubes in the aqueous solutions before mixing was 470 mg/L. After 10 minutes, the suspension was compacted by centrifugation (5000 rpm for 10 minutes), yielding a brown-black solid and blue-black supernatant with a pH value of approximately 7. Addition of ascorbic acid to the supernatant to reduce any vanadium (+5) back to the vanadium (+4) oxidation state caused the color to become pale green, indicating that the nanotubes were essentially quantitatively combined with the thus obtained solid composite material. The centripetal force and pressure exerted on the composite material during centrifugation were approximately 8 N and 0.4 MPa, respectively. Based on the amounts of reagents used in the preparation, the carbon nanotubes are estimated to comprise 0.12% of the total weight of solids in the composite material.

The features of the present invention disclosed in the specification, the claims and/or in the accompanying drawings, may, both separately, and in any combination thereof, be material for realizing the invention in various forms thereof.

The invention claimed is:

1. A composite material comprising:
carbon nanotubes; and
a Me-carbonate, wherein Me represents a metal cation,
wherein said carbon nanotubes have attached thereto functional groups comprising oxygen atoms, wherein said functional groups comprising oxygen atoms are selected from the group consisting of —COOH and —OH,
wherein said carbon nanotubes with attached functional groups comprising oxygen atoms have been mixed with urea and then heated to a temperature greater than the melting point of urea, such that urea, or a decomposition product thereof, react to modify said functional groups comprising oxygen atoms, or polymerize, to introduce new functional groups, said new functional groups being —$CONHCONH_2$, and
wherein said functional groups comprising oxygen atoms and said new functional groups, which are attached to said carbon nanotubes, make the carbon nanotubes dispersible in a polar solvent.

2. The composite material according to claim 1, wherein Me represents a mixture of different metal cations.

3. The composite material according to claim 1, wherein Me represents $Ca^{2+}$ or $Mg^{2+}$ or a combination of $Ca^{2+}$ and $Mg^{2+}$.

4. The composite material according to claim 1, wherein the carbon nanotubes are single-walled, double-walled, or multi-walled carbon nanotubes, or a mixture thereof.

5. The composite material according to claim 1, wherein said functional groups are attached to the ends of said carbon nanotubes.

6. The composite material according to claim 1, wherein said functional groups are attached to the walls of said carbon nanotubes.

7. The composite material according to claim 1, wherein said functional groups are attached to the ends and to the walls of said carbon nanotubes.

8. The composite material according to claim 1, wherein said carbon nanotubes are aggregated into bundles or ropes.

9. The composite material according to claim 1, wherein an aldehyde has been added to the urea to modulate said modification or polymerization reactions.

10. The composite material according to claim 1, wherein said metal cation Me is selected from the group of metal ions comprising $Ag^{1+}$, $Mg^{2+}$, $Ca^{2+}$, $Sr^{2+}$, $Ba^{2+}$, $Mn^{2+}$, $Fe^{2+}$, $Co^{2+}$, $Ni^{2+}$, $Cu^{2+}$, $Zn^{2+}$, $Cd^{2+}$, $Sn^{2+}$, $Pb^{2+}$, $Eu^{2+}$, $Sc^{3+}$, $Y^{3+}$, $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, $Yb^{3+}$, $Lu^{3+}$, and $Bi^{3+}$, or said metal cation Me is selected from the group of metal oxo-ions comprising $VO^{2+}$ and $UO_2^{2+}$.

11. The composite material according to claim 1, wherein said Me-carbonate has the empirical formula $(Me)_x(CO3)_y(OH)_z$, wherein Me is a divalent metal cation, and x, y, and z have integral values satisfying the equation $x=y+z/2$ including z=0.

12. The composite material according to claim 1, wherein said Me-carbonate is $CaCO_3$, which comprises an amorphous or crystalline phase of $CaCO_3$ or combinations thereof.

13. The composite material according to claim 1, on a substrate.

14. The composite material according to claim 1 produced by precipitation from solution.

15. The composite material according to claim 1 produced by precipitation from solution, wherein said precipitation comprises combining a dispersion of carbon nanotubes in a polar solvent with a non-carbonate salt of Me and a source of carbonate ion, wherein said polar solvent is water or a $C_1$-$C_3$ alcohol.

16. The composite material according to claim 1 produced by precipitation from solution, wherein said precipitation comprises combining a dispersion of carbon nanotubes in a first polar solvent with a powder of Me-carbonate or a dispersion of Me-carbonate in a second polar solvent, wherein said first and said first and second polar solvents are selected from the group consisting of water and a $C_1$-$C_3$ alcohol.

17. The composite material according to claim 14 produced by precipitation from solution, and collected, by centrifugation.

18. The composite material according to claim 17, wherein said composite material, after collection, is deposited on a substrate.

19. The composite material according to claim 18 which is deposited onto a substrate as a suspension.

20. The composite material according to claim 14 which is directly precipitated from solution onto a substrate.

21. The composite material according to claim 13, wherein said substrate is made of a material selected from the group comprising glass, silicon, metal, semimetal, plastic, electrically conductive glass, electrically conductive polymer, ceramic, textile, cellulose, starch, tooth, cartilage, tendon and bone.

22. The composite material according to claim 13, wherein said substrate is a patterned substrate.

23. The composite material according to claim 1, wherein the Me-carbonate in said composite material is further processed by partially or completely transforming it into a metal or metal oxide by heating.

24. The composite material according to claim 1, wherein the Me-carbonate in said composite material is further processed by partially or completely transforming it into a metal or metal hydride by reduction.

25. The composite material according to claim 1, wherein said Me-carbonate in said composite material is further processed by partially or completely transforming it into another Me-salt by exposing the composite material to an acid, thus producing said another Me-salt.

26. The composite material according to claim 25, wherein after transformation of said Me-carbonate into another Me-salt, said composite material is treated, with a polar solvent selected from the group consisting of water and a $C_1$-$C_3$ alcohol.

27. The composite material according to claim 25, comprising carbon nanotube shells which have an average length in all three dimensions of 1-100 μm.

28. The composite material according to claim 25, which, after transformation of said Me-carbonate into another Me-salt, is dried on a substrate.

29. The composite material according to claim 28, which comprises at least one carbon nanotube layer, on a substrate.

30. A method of forming a carbon nanotube composite material comprising:
a) providing carbon nanotubes having attached thereto functional groups comprising oxygen atoms, wherein said functional groups comprising oxygen atoms are selected from the group consisting of —COOH and —OH,
b) mixing said carbon nanotubes having attached functional groups comprising oxygen atoms with urea and then heating to a temperature greater than the melting point of urea, such that urea, or a decomposition product thereof, react to modify said functional groups comprising oxygen atoms, or polymerize, to introduce new functional groups, said new functional groups being —CONHCONH$_2$, and wherein said functional groups comprising oxygen atoms and said new functional groups, which are attached to said carbon nanotubes, make the carbon nanotubes dispersible in a polar solvent comprising water or a $C_1$-$C_3$ alcohol, and thereafter dispersing the carbon nanotubes in the polar solvent,
c) introducing metal cations and carbonate anions into said polar solvent comprising dispersed carbon nanotubes, and
d) co-precipitating a Me-carbonate and said carbon nanotubes, wherein Me represents a metal cation, thereby forming a carbon nanotube composite material comprising said Me-carbonate.

31. The method according to claim 30, wherein b) melting the urea occurs in the presence of an aldehyde.

32. The method according to claim 30, wherein c) and d) occur by dissolving a non-carbonate salt of Me in said polar solvent comprising said functionalized carbon nanotubes and exposing said solution to gaseous ammonium carbonate or a mixture of gaseous ammonia and carbon dioxide, thereby co-precipitating a composite material comprising said carbon nanotubes and said Me-carbonate.

33. The method according to claim 32, wherein said non-carbonate salt of Me comprises a monovalent, divalent, or trivalent metal cations.

34. The method according to claim 33, wherein said non-carbonate salt of Me is a calcium salt.

35. The method according to claim 30, wherein c) and d) occur by combining with said dispersion of carbon nanotubes in a polar solvent firstly a carbonate salt of a monovalent cation, or solution thereof, and secondly a non-carbonate salt of Me, or solution thereof, or by combining with said dispersion of carbon nanotubes in a polar solvent firstly a non-carbonate salt of Me, or solution thereof, and secondly a carbonate salt of monovalent cation, or solution thereof, wherein Me represents a metal cation, thereby co-precipitating a composite material comprising said carbon nanotubes and said Me-carbonate.

36. The method according to claim 35, wherein said carbonate salt of a monovalent cation is $Na_2CO_3$ and said non-carbonate salt of Me is $CaCl_2$.

37. The method according to claim 30, wherein c) and d) occur by combining with said dispersion of carbon nanotubes in a polar solvent, urea, or a solution thereof, and a non-carbonate salt of Me, or solution thereof, wherein Me represents a metal cation and thereafter heating a solution or dispersion, thereby co-precipitating a composite material comprising said carbon nanotubes and said Me-carbonate.

38. The method according to claim 30, wherein c) and d) occur by combining with said dispersion of carbon nanotubes in a polar solvent, in any order, urea, or a solution thereof, and a non-carbonate salt of Me, or solution thereof, wherein Me represents a metal cation, and urease, or a solution thereof, thereby co-precipitating a composite material comprising said carbon nanotubes and said Me-carbonate.

39. The method according to claim 37, wherein said non-carbonate salt of Me is a calcium salt, preferably $CaCl_2$.

40. The method according to claim 37, wherein said Me-carbonate is $CaCO_3$.

41. The method according to claim 30, wherein said co-precipitation in d) occurs in the presence of a substrate.

42. A method of forming a carbon nanotube composite material comprising:
   a) providing carbon nanotubes having attached thereto functional groups comprising oxygen atoms, wherein said functional groups comprising oxygen atoms are selected from the group consisting of —COOH and —OH,
   b) mixing said carbon nanotubes having attached functional groups comprising oxygen atoms with urea and then heating to a temperature greater than the melting point of urea, such that urea, or a decomposition product thereof, react to modify said functional groups comprising oxygen atoms, or polymerize, to introduce new functional groups, said new functional groups being —CONHCONH$_2$, and wherein said functional groups comprising oxygen atoms and said new functional groups, which are attached to said carbon nanotubes, make the carbon nanotubes dispersible in a polar solvent comprising water or a $C_1$-$C_3$ alcohol, and thereafter dispersing said carbon nanotubes in the polar solvent,
   c) providing a dispersion of Me-carbonate particles, in a polar solvent, including water or a $C_1$-$C_3$ alcohol,
   d) combining said dispersion of carbon nanotubes with said dispersion of Me-carbonate particles, thereby forming a carbon nanotube composite material comprising said carbon nanotubes adsorbed to the surfaces of said Me-carbonate particles.

43. The method according to claim 42, wherein b) melting the urea occurs in the presence of an aldehyde.

44. The method according to claim 42, wherein said dispersion of Me-carbonate particles in a polar solvent in c) is prepared by mixing a solution of soluble non-carbonate salt of Me with a solution of soluble carbonate salt of a monovalent cation, wherein the solvent for both solutions is water.

45. The method according to claim 44, wherein said soluble non-carbonate salt of Me comprises monovalent, divalent or trivalent metal cations.

46. The method according to claim 45, wherein said soluble non-carbonate salt of Me is a calcium salt.

47. The method according to claim 44, wherein said soluble carbonate salt of a monovalent cation is $Na_2CO_3$.

48. The method according to claim 42, wherein said dispersion of Me-carbonate particles in a polar solvent in c) is prepared by dispersing precipitated calcium carbonate powder in said polar solvent.

49. The method according to claim 30, wherein said carbon nanotube composite material comprising said Me-carbonate is precipitated from solution, and collected.

50. The method according to claim 49, wherein said carbon nanotube composite material, after collection, is deposited on a substrate.

51. The method according to claim 30, wherein said carbon nanotube composite material comprising said metal carbonate is deposited onto a substrate as a suspension and allowed to dry.

52. The method according to claim 42, wherein said adsorption of carbon nanotubes to Me-carbonate particles of d) occurs on a substrate.

53. The composite material according to claim 30, wherein said substrate is made of a material selected from the group comprising glass, silicon, metal, semimetal, plastic, electrically conductive glass, electrically conductive polymer, ceramic, textile, cellulose, starch, tooth, cartilage, tendon, and bone.

54. The method according to claim 53, wherein a surface of said substrate is primed with functional groups, that bind to a Me-carbonate by coordinative bond or hydrogen bond formation.

55. The method according to claim 49, wherein said substrate is a patterned substrate.

56. The method according to claim 49, wherein said substrate is patterned with functional groups that bind to a Me-carbonate by coordinative bond or hydrogen bond formation, and functional groups that do not bind to a Me-carbonate by coordinative bond or hydrogen bond formation.

57. The method according to claim 30, wherein said carbon nanotube composite material comprising a Me-carbonate is subjected to forces causing said material to fracture, by grinding, by application of pressure, by application of ultrasound, or by thermal shock.

58. The method according to claim 49, wherein said carbon nanotube composite material comprising a Me-carbonate on a substrate is subjected to pressure, wherein said pressure is sufficient to break said carbon nanotube composite material into fragments.

59. The method according to claim 30, wherein said Me-carbonate in said carbon nanotube composite material comprising a Me-carbonate is further processed by partially or completely transforming it into a carbonated hydroxyapatite by hydrothermal treatment with a solution of a phosphate salt of a monovalent cation.

60. The method according to claim 30, wherein said Me-carbonate in said composite material is further processed by partially or completely transforming it into a metal or metal oxide by heating.

61. The method according to claim 30, wherein said Me-carbonate in said composite material is further processed by transforming it into a metal or metal hydride by reduction.

62. The method according to claim 30, wherein said Me-carbonate in said composite material is further processed by partially or completely transforming it into another Me-salt by exposing said composite material to an acid, thus producing said Me-salt.

63. The method according to claim 62, wherein said acid is an aqueous solution.

64. The method according to claim 62, wherein said acid is gaseous hydrochloric acid.

65. The method according to claim 62, wherein said composite material, after transformation of said Me-carbonate into another Me-salt, is treated, with a polar solvent including water or a $C_1$-$C_3$ alcohol, thus removing said other Me-salt, and, optionally, dried.

66. The method according to claim 62, wherein said composite material, after transformation of said Me-carbonate into another Me-salt, is dried and then treated, with a polar solvent including water or a $C_1$-$C_3$ alcohol, thus removing said other Me-salt.

67. The method according to claim 62, wherein said composite material is deposited on a substrate.

68. The method according to claim 67, wherein, after deposition of said composite material on a substrate, an adhesive tape is applied to said composite material and then removed, thereby lifting off some composite material.

69. A carbon nanotube composite material produced by the method of claim 30.

70. The carbon nanotube composite material of claim 1, comprising a crystalline Me-carbonate component.

71. A method of using a carbon nanotube composite material according to claim 69 in an electron field-emitting material, cathode ray tubes, vacuum fluorescence displays, microwave tubes, or lighting elements.

72. A method of using a carbon nanotube composite material according to claim 69 in a microelectronic device, thin-film transistor; in an electrochemical device, in a chemical or electrochemical sensor, in a touch sensor, in an actuator, in an artificial muscle; in an electrically conductive layer; or in electrophoretic ink.

73. A method of using a carbon nanotube composite material according to claim 69 in a biomedical device; as a support for cell growth, as a scaffold for regeneration of bone, tooth, or cartilage; as a replacement for bone, tooth, or cartilage; for the surface treatment of implanted biomedical materials or devices; or as a capsule for drug delivery.

74. A method of using a carbon nanotube composite material according to claim 69 as a transparent electrode on glass, plastic, or semiconductor.

* * * * *